US009094951B2

(12) United States Patent
Li et al.

(10) Patent No.: US 9,094,951 B2
(45) Date of Patent: Jul. 28, 2015

(54) COMMUNICATIONS METHODS AND APPARATUS FOR ALLOCATION OF RESOURCES AND HANDOVER RELATED MEASUREMENTS

(71) Applicant: QUALCOMM Incorporated, San Diego, CA (US)

(72) Inventors: Junyi Li, Chester, NJ (US); Nilesh Nilkanth Khude, Somerset, NJ (US); Vincent Douglas Park, Budd Lake, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 13/828,420

(22) Filed: Mar. 14, 2013

(65) Prior Publication Data

US 2014/0274079 A1    Sep. 18, 2014

(51) Int. Cl.
*H04W 72/04* (2009.01)
*H04L 5/00* (2006.01)
(Continued)

(52) U.S. Cl.
CPC ............... *H04W 72/04* (2013.01); *H04L 5/00* (2013.01); *H04W 72/0486* (2013.01); *H04W 48/16* (2013.01); *H04W 52/0206* (2013.01); *H04W 84/045* (2013.01)

(58) Field of Classification Search
USPC ............... 455/450, 414.1, 418, 452.1, 67.11, 455/456.5, 436–444; 370/328, 329, 33; 375/316; 715/771
See application file for complete search history.

(56) References Cited

U.S. PATENT DOCUMENTS

2009/0046665 A1   2/2009   Robson et al.
2009/0291686 A1   11/2009  Alpert et al.
(Continued)

FOREIGN PATENT DOCUMENTS

WO    WO-2013037842 A1   3/2013

OTHER PUBLICATIONS

"LTE; Evolved Universal Terrestrial Radio Access (E-UTRA); Physical Layer Procedures (3GPP TS 36.213 version 10.2.0 Release 10)," ETSI TS 136 213 v10.2.0 (Jun. 2011), Technical Specification, Jun. 2011, ETSI, Sophia-Antipolis Cedex, FR, 122 pgs.

(Continued)

*Primary Examiner* — Diane Mizrahi
(74) *Attorney, Agent, or Firm* — Holland & Hart LLP

(57) ABSTRACT

Methods and apparatus for allocation of resources for handover related measurements in a communications system including user equipment (UE) devices, a macro base station and small base stations (e.g., femtocells) are described. Some embodiments are well suited for systems where the number of femtocells may equal or outnumber the number of UE devices. In some embodiments a macro base station allocates periodic communications resources for transmission of pilots by UEs or femtocells. The macro base station configures either femtocells or active UEs to transmit pilots using the allocated communications resources based on the relative number of femtocells to active UEs in the coverage area of the macro base station, devices which are lower in number transmitting the pilots. Transmitters (UE devices or femtocells) transmit pilots along with identification information using the allocated resource(s) and receivers measure the pilot signals. The pilot signal measurements may be used to make handover decisions.

20 Claims, 14 Drawing Sheets

(51) Int. Cl.
  *H04W 48/16* (2009.01)
  *H04W 52/02* (2009.01)
  *H04W 84/04* (2009.01)

(56) References Cited

U.S. PATENT DOCUMENTS

| | | |
|---|---|---|
| 2010/0124927 A1 | 5/2010 | Eskicioglu et al. |
| 2010/0165882 A1 | 7/2010 | Palanki et al. |
| 2010/0260121 A1* | 10/2010 | Gholmieh et al. ............ 370/329 |
| 2011/0028144 A1 | 2/2011 | Catovic et al. |
| 2011/0134747 A1 | 6/2011 | Kwon et al. |
| 2011/0274097 A1 | 11/2011 | Zhang et al. |
| 2012/0076106 A1* | 3/2012 | Bhattad et al. ................ 370/330 |
| 2012/0113862 A1 | 5/2012 | Santhanam et al. |
| 2012/0213092 A1 | 8/2012 | Sun et al. |
| 2012/0225662 A1 | 9/2012 | Jo et al. |
| 2014/0073368 A1* | 3/2014 | Teyeb et al. ................... 455/501 |
| 2014/0256328 A1 | 9/2014 | Li et al. |
| 2014/0364116 A1 | 12/2014 | Jorguseski et al. |

OTHER PUBLICATIONS

Mediatek Inc., "Methods for Efficient Discovery of Small Cells," 3GPP TSG-RAN WG1 #72, R1-130225, Agenda Item 7.3.5.3, Jan. 28-Feb. 1, 2013, St. Julian's, Malta, 4 pgs.

ISA/EPO, International Search Report and Written Opinion of the International Searching Authority, Int'l App. No. PCT/US2014/021053, Jul. 3, 2014, European Patent Office, Rijswijk, NL, 11 pgs.

Qualcomm Incorporated, "Mechanisms for Efficient Small Cell Operation," 3GPP TSG-RAN WG1 #72, R1-130595, Agenda Item 7.3.5.3, Jan. 28-Feb. 1, 2013, St. Julian, Malta, 3 pgs.

IPEA/EPO, Second Written Opinion of the International Preliminary Examining Authority, Int'l App. No. PCT/US2014/021053, May 27, 2015, European Patent Office, Münich, DE, 5 pgs.

* cited by examiner

| FIGURE 5A |
| --- |
| FIGURE 5B |

| FIGURE 9A |
| FIGURE 9B |

COMMUNICATIONS METHODS AND APPARATUS FOR ALLOCATION OF RESOURCES AND HANDOVER RELATED MEASUREMENTS

FIELD

Various embodiments relate to wireless communications methods and apparatus and, more particularly, to wireless communications methods and apparatus for efficient allocation of communications resources for signal, e.g., pilot signal, transmissions and related measurements in systems where small, e.g., femto and/or pico, base stations are deployed in addition to mobile wireless terminals and macro base stations.

BACKGROUND

In cellular systems normally the base-stations transmit wideband pilots, e.g., in every sub-frame, for channel estimations as well as for RSSI (Received Signal Strength Indication) measurements. The handover related measurements are traditionally done by the User Equipment (UE) devices, e.g., wireless terminals such as cell phones. In normal cellular systems, UEs perform measurements on the received pilot signals and report the RSSI measurements of a candidate base station for handover to the serving base station. The working assumptions of such designs are that the base stations are deployed in a planned fashion, the base stations are always transmitting, and that the number of UEs is much larger than the number of base stations. However with the deployment of small base stations (also referred to as small cells) in various systems such assumptions are not always valid.

It is envisioned that the future cellular systems will have a dense and unplanned deployment of the small cells. With dense and unplanned deployment of small base stations with small coverage areas, it is not efficient that the small cells transmit pilots in each sub-frame as it causes pilot pollution (e.g., interference between pilot signals). Pilots of the small cells interfere with each other and are interfered by traffic from active small cells and macro cells. This may result in erroneous RSSI measurements made by UEs.

When the number of UEs in a region is comparable to or less than the number of small cells, many small cells are often not in communications with a UE, i.e., many small cells will not have a UE attached to them most of the time. The pilot transmissions by such small cells can cause interference to active small cells' transmissions, e.g., the transmissions by small base stations which have active UEs attached to them. Furthermore, the pilot transmissions also increase power consumption of the small cells as compared to the amount of power which would be required if such transmission did not have to be made.

While under some conditions, the number of small cells in an area may outnumber the number of UE's in an area, this may not always be the case and may change with time.

From the above discussion, it should be appreciated that there is a need for methods and/or apparatus for dynamically allocating resources for pilot transmissions which results in efficient utilization of resources for pilot signal transmissions.

SUMMARY

Methods and apparatus that facilitate efficient use of communications resources, e.g., resources which can be used to transmit pilot signals are described. Various features facilitate handover related measurements and efficient allocation of resources which can be used for handover related measurements in a communications system including user equipment (UE) devices, e.g., wireless terminals, a macro base station (e.g., an eNodeB also referred to as eNB) and small base stations, e.g., femtocells or picocells. Some of the features described in various embodiments are well suited for systems with dense deployment of small base stations, for example, in an area where the number of small base stations, e.g., femto cells and/or picocells, is comparable to or exceeds the number of active UEs (user equipment devices) in an area. In at least some LTE embodiments the active UEs are considered to be the UEs which are RRC_connected UEs.

In accordance with one aspect of some embodiments a macro base station allocates periodic communications resources for transmission of wideband signals, e.g., pilot signals, by active UE devices, and/or by small base stations. The periodic communications resources for active UEs are allocated in an uplink (UL) band while the periodic resources for small base stations are allocated in a downlink (DL) band. In some embodiments, the periodic communications resources for both active UEs and for small base stations are allocated in same (DL or UL) band. In some embodiments at any given time the macro base station allocates resources for pilot signal transmissions by UEs or pilot signal transmissions by small base stations but not both with the macro base station controlling whether the UEs or small base stations will perform pilot signal transmissions during any given time period.

In some by not necessarily all embodiments the macro base station configures either small cells or active UEs to transmit in the allocated communications resources based on the density of the small cells and the density of the active UEs in the macro cell where the active UEs and the small cells are within the coverage area of the macro base station. In some embodiments the macro base station (eNB) configures the active UEs to transmit pilot signals using the handover resources, e.g., pilot signal communications resources, if the number of UEs in an area, e.g., a macro cell coverage area corresponding to the macro cell, is smaller than the number small cells in the area. In some such embodiments, the small cells are configured to receive the signals transmitted by the active UEs using the handover resources when the handover resources are to be used by the UEs for pilot signal transmissions rather than the small cells. Alternatively, in some embodiments, e.g., if the number of active UEs is greater than the number of the small cells, the macro cell (eNB) configures the small cells in the area, e.g., macro cell coverage area, to transmit pilot signals in the handover resources. In such a case the active UEs are configured to receive the signals transmitted by the small cells using the handover resources.

In some embodiments when active UEs are configured to transmit pilots, the small cells under the coverage area of the macro base station are controlled not to transmit pilots in the allocated communications resources dedicated for pilot transmissions. Furthermore, in at least some embodiments the small cells do not schedule any UE transmissions on the periodic resources allocated for pilot transmissions. In at least some such embodiments UE's may select the pilot signal resources to use for pilot signal transmission and may transmit a device identifier as part of the pilot signal transmission so that other devices can identify the source of the pilot signal. In other embodiments, devices may know which of a plurality of pilot signal resources they are to use based on their device identifier.

The configuration can change dynamically in time and space with the macro base station controlling whether UEs or small cells are to transmit pilot signals during a given time period. In addition the macro base station may control and/or alter the amount of pilot signal transmission resources available for use during a given time period, e.g., based on the number of small cells and/or UEs in an area. The macro base station can, and in some embodiments does, transmit, e.g., broadcast, information indicating whether small base stations or UEs are to transmit pilots during a period of time and/or the information indicating the communications resources dedicated for such signal transmissions. Based on the transmitted information the UEs will either monitor for or transmit pilots. For example, if the pilot signal resources are dedicated for use by UE pilot signal transmissions, the UEs will transmit pilots. However, if the pilot signal resources are dedicated for small base station pilot signal transmissions, the small base stations will transmit pilots and the UEs will monitor for the pilot signal transmissions.

An exemplary method of operating a first base station (e.g., macro base station) corresponding to a cell having a coverage area in which a small base station, e.g., femto or pico base station, is located, in accordance with one embodiment comprises: allocating communications resources for pilot signal transmissions by any of a plurality of small base stations or UE devices, said allocated communications resources being dedicated for pilot signal transmissions; determining whether small base stations or UE devices should use said allocated communications resources for pilot signal transmissions; and communicating information to at least one of said small base station or a UE device indicating the communications resources allocated for pilot signal transmissions.

An exemplary first base station (e.g., a macro base station) corresponding to a cell having a coverage area in which a small base station is located, in accordance with one embodiment comprises at least one processor configured to: allocate communications resources for pilot signal transmissions by any of a plurality of small base stations or UE devices, said allocated communications resources being dedicated for pilot signal transmissions; determine whether small base stations or UE devices should use said allocated communications resources for pilot signal transmissions; and communicate information to at least one of said small base station or a UE device indicating the communications resources allocated for pilot signal transmissions. The first base station may, and in some embodiments does, include a memory coupled to the at least one processor.

In at least some embodiments an exemplary method of operating a small base station, e.g., a femtocell or a picocell, includes receiving information indicating the communication resources dedicated for pilot transmissions, determining communications resources dedicated for use in transmitting pilot signals to UE devices or receiving pilot signals from UE devices, and determining, possibly based on the received) information, whether base stations are to transmit pilot signals on the dedicated communications resources or UE devices are to transmit pilot signals using the dedicated communications resources. In at least some such embodiments the resources dedicated by the macro cell for pilot transmissions by one of small base stations or UE devices is used by either the small base stations or UE devices but not both at the same time.

An exemplary small base station implemented in accordance with one exemplary embodiment comprises at least one processor configured to determine whether communications resources dedicated for pilot signal transmissions are for use by small base stations in transmitting pilot signals to UE devices or are for use in receiving pilot signals from UE devices and receive information, e.g., a signal from a macro base station indicating whether small base stations are to transmit pilot signals on the dedicated communications resources or UE devices are to transmit pilot signals using the dedicated communications resources.

One exemplary method of operating a user equipment (UE) device in accordance with one exemplary embodiment comprises: receiving information indicating the communication resources dedicated for pilot transmissions, determining communications resources dedicated for use in transmitting pilot signals to base stations or receiving pilot signals from base stations; and determining, possibly based on the received information, whether base stations are to transmit pilot signals on said dedicated communications resources or UE devices are to transmit pilot signals using said dedicated communications resources.

An exemplary user equipment device in at least some embodiments includes at least one processor configured to determine whether a set of communications resources, e.g., pilot signal transmission resources, are dedicated for use in transmitting pilot signals to base stations or for use in receiving pilot signals from base stations and to receive information, e.g., a broadcast signal from a base station, indicating whether base stations, e.g., small base stations, are to transmit pilot signals on the dedicated communications resources or if UE devices are to transmit pilot signals using said dedicated communications resources. The user equipment device may, and in some embodiments does, include a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
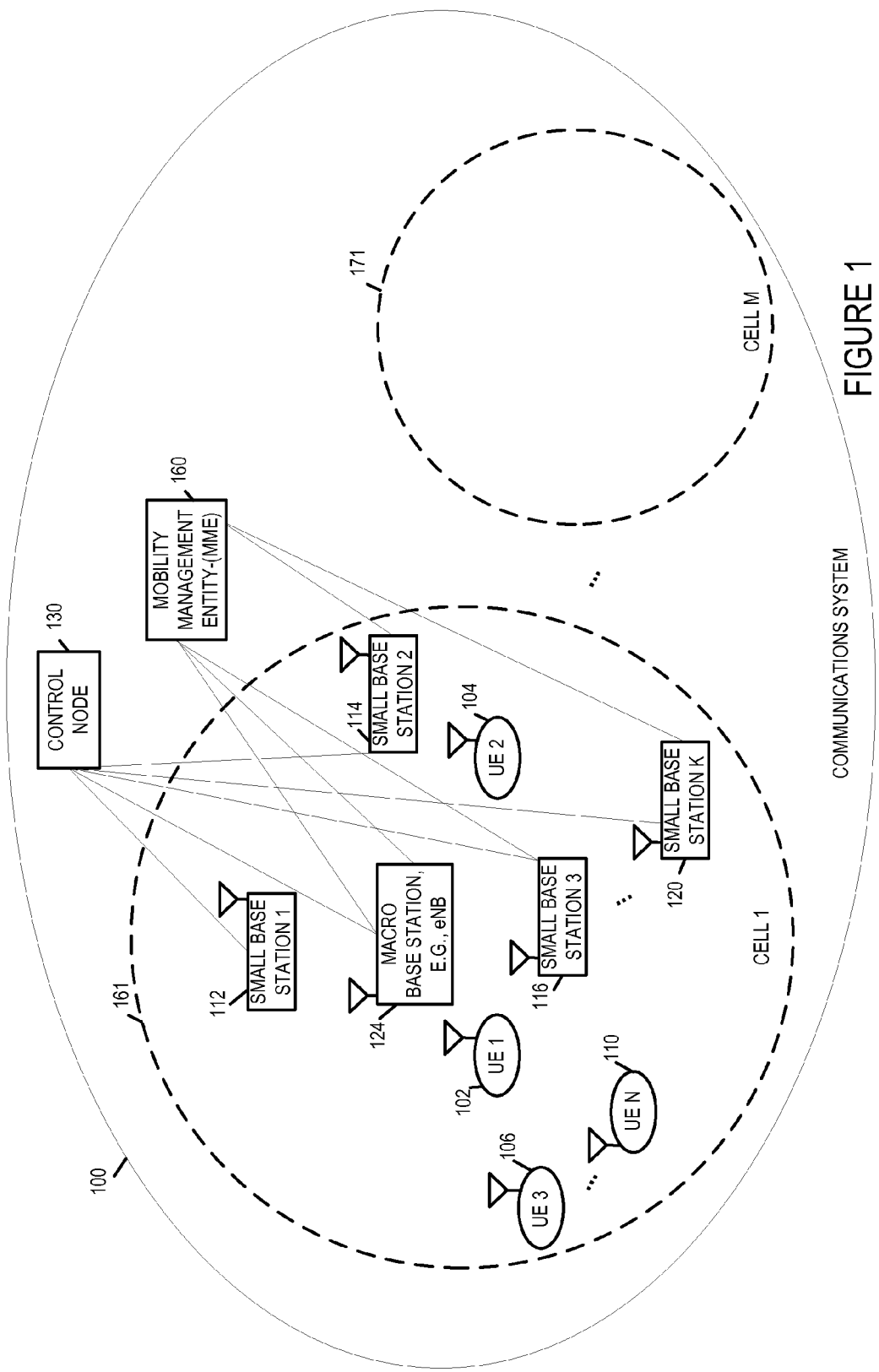
FIG. 1 illustrates an exemplary wireless communications system implemented in accordance with one exemplary embodiment.

FIG. 1 illustrates an exemplary communications system 100 including a base station 124, e.g., a macro base station, with a coverage area represented by cell 1 161, a plurality of user equipment devices (UEs), e.g., wireless terminals, including UE 1 102, UE 2 104, UE 3 106 through UE N 110, and a plurality of small base stations also called small cells including small base station 1 112, small base station 2 114, small base station 3 116, through small base station K 120.

Each small base station may be, e.g., a femtocell or a picocell. The base station 124 is a macro base station (also referred to as macro cell) and serves as an attachment point for at least some of the UEs in its coverage area, e.g., cell 161. The macro base station 124 may, and in some embodiments is, implemented as an eNodeB. Femto cell is intended to be a term which is not technology specific and can be used to refer to any of a wide range of different types of femto cells. The coverage area of the small base stations is normally much smaller, e.g., less than 50% of the coverage area of the macro base station. Thus, as shown in FIG. 1, multiple small base stations may be within the coverage area of a single macro base station 124. The femto cells in the present application are not intended to be limited to a particular technology unless expressly identified using a technology specific term. Femto cells may be implemented as HeNB (Home eNode B) cells in LTE while in 3GPP terminology a Home Node B (HNB) is a femto cell. In some but not necessarily all embodiments, a femto cell has a range (radius) of the order of 10 meters while a picocell has a range that is 200 meters or less. This is considerably smaller than the typical range of a macro cell which may have, and sometimes does have, a range up to 35 kilometers (approximately 22 miles). While such a large range is possible for a macro base station, smaller ranges are often used for macro base station 124. Small cells may include, in addition to femto cells and pico cells other types of small cells. For example the term microcell is used by some companies to refer to a base station with a range of approximate 12 meters. Thus, while the term micro cell is used by some companies to refer to their femto cells, such cells are to be considered small cells for purposes of the discussion included in the present application.

In addition to the base stations and the UEs, system 100 further includes a mobility management entity (MME) 160 and a control node 130, e.g., a central control entity such as a radio network controller. System 100 may include a plurality of other macro base stations with corresponding coverage areas as illustrated in the figure by cell M 171. Cell M 171 may be similar to cell 1 161 and may include a plurality of UE devices and small base stations in addition to a macro base station to which the coverage area illustrated by cell M 171 corresponds. In some embodiments the macro base station 124 and small base stations exchange signaling and information with the MME device 160 to facilitate tracking of the locations of mobile devices and/or to support or provide other communications services, e.g., paging and/or location based services to the UE devices in the system 100. While a single MME 160 is shown in FIG. 1, it should be appreciated that the system 100 may include multiple MMEs.

In various embodiments the UEs shown in FIG. 1 support Wide Area Network (WAN) communications, e.g., cellular network communications through base stations, as well as peer to peer communications, e.g., direct device to device communications. In some, but not necessarily all, embodiments, one or more UE devices are implemented as portable communications devices such as handheld cell phones or portable personal data assistant (PDA) devices. Various base stations (e.g., macro and small base stations) and/or the other infrastructure elements such as the control node 130 and MME 160, in some embodiments, are coupled via a backhaul link, to one another and/or to other infrastructure nodes for exchanging information. The backhaul link may be a wired or wireless link.

In accordance with one aspect of some embodiments, the macro base station 124 allocates periodic communications resources (time and frequency resources) for transmission of pilots and device identification information by the UE devices or the small base stations, e.g., in the coverage area of the macro base station. In some embodiments part of the identification information may determine the pilot sequence transmitted by the UE devices or the small base stations. The communications resources can be used by a device to transmit a pilot signal. In some embodiments, e.g., where UE devices can select which dedicated pilot signal resources to use, the UE device normally transmits a pilot, e.g., one or more reference signals transmitted on different tones, along with device identification information so that a device receiving the pilots can identify which UE transmitted the pilots. Thus, while the pilot resources are dedicated to communicating pilot signals and/or corresponding information, e.g., information identifying the transmitting device, the resources may be used autonomously on a contention basis with different UE's and/or small base stations contending amongst themselves to use the resources since they are not dedicated to a specific individual device in some embodiments.

In some embodiments, at any given time, the macro base station 124 configures either the UE devices or the small base stations, but not both, to transmit pilot signals using the allocated periodic communications resources, e.g., in the coverage area of the macro base station 124. The decision of whether UE devices or small base stations are to transmit pilot signals is based on, e.g., the number and/or density of small base stations in the macro cell coverage area and/or the number or density of active UE devices (i.e., non idle UEs) in the coverage area of the macro base station 124. The decision of whether UE devices or small base stations are to transmit, in some embodiments, is based on the number of small base stations relative to the number of active UE devices in an area. In accordance with one aspect of some embodiments when there is a dense deployment of small base stations, e.g., the number of small base stations K is comparable to or exceeds the number of active UEs N in the area (e.g., K≥N) the macro base station 124 configures the active UE devices to transmit pilots using the allocated periodic communications resources while configuring the small base stations to receive the pilot signals transmitted by the UE devices on the allocated periodic communications resources and controls the small base stations to refrain from transmitting pilots. In some embodiments when the number of active UE devices is greater than the number of small base stations in the area (e.g., N>K) the macro base station 124 configures the small base stations to transmit pilots using the allocated periodic communications resources while configuring the active UE devices to refrain from transmitting pilots and to receive the pilot signals transmitted by the small cells on the allocated periodic communications resources.

Thus, in at least some embodiments, the macro base station 124 makes the decision of whether UEs or small base stations should transmit pilot signals in a manner which is intended to minimize the number of devices, in addition to the macro base station 124, that will be transmitting pilots during a given time interval. It should be noted that regardless of whether UEs or small cells transmit pilots the macro base station 124 will transmit pilots in the usual manner. The decision of whether UEs or small base stations should transmit pilots is made by the macro base station 124, e.g., on a recurring basis, e.g., periodically or when a change in the number of small base stations or active UEs in the macro base station coverage area or a portion of the macro base station coverage area is detected. In some embodiments the decision whether the small base stations or UE devices are to transmit pilots is also based on the current configuration, e.g. the macro base station can have hysteresis in switching to other configuration to avoid ping pong effect. In some embodiments if macro base station has determined that the UE devices are to transmit pilot signals, then it determines that the small base stations are to transmit pilots if the ratio of number of active UE devices (N) to the number of small base stations (K) exceeds a first threshold. Similarly if macro base station has determined that the small base stations are to transmit pilot signals, then it determines that UE devices are to transmit pilots if the ratio of number of active UE devices (N) to the number of small base stations (K) is below a second threshold. In some embodiments the first and second thresholds may depend on the number of UE devices and the number of small base stations.

The amount of resources dedicated for pilot signal transmissions by entities other than the macro base station can be, and sometimes is reconsidered and changed in response to a change in the number of small base stations or active UE devices in an area. Thus, in at least some embodiments the macro base station can and does vary the amount of resources dedicated to pilot signal transmissions at different points in time. In some embodiments, determining the amount of resources to allocate for pilot signal transmission is performed by the same module and/or component of the macro base station which decides whether UE devices or small base stations should transmit pilots.

A transmitting device (e.g., UE devices or the small base stations depending on the configuration specified by the macro base station 124) selects communications resource(s) from the allocated communications resources, e.g., dedicated pilot signal resources, and transmit pilots along with identification information using the selected transmission resource(s), e.g., periodically. Thus, selection of which pilot signal resource to use from the set of dedicated resources is normally made autonomously by the device, e.g., small base station or UE device, which is to transmit the pilot signal. The chance of a collision is reduced in cases where the macro base station allocates sufficient resources to avoid or minimize collisions and by the macro base station's selection between small base stations and UE devices to transmit pilots, e.g., by making a selection likely to minimize the number of devices transmitting pilot signals. The devices configured to receive the pilot signals (UE devices or the small base stations depending on the configuration set by the macro base station 124) perform measurements, e.g., received signal strength and/or other signal measurements, and report the measurement results and corresponding device identifiers to, e.g., the base station 124 or a control node 130. In some embodiments the macro base station or the control node uses the received report to make handover decisions.

Figure 2:
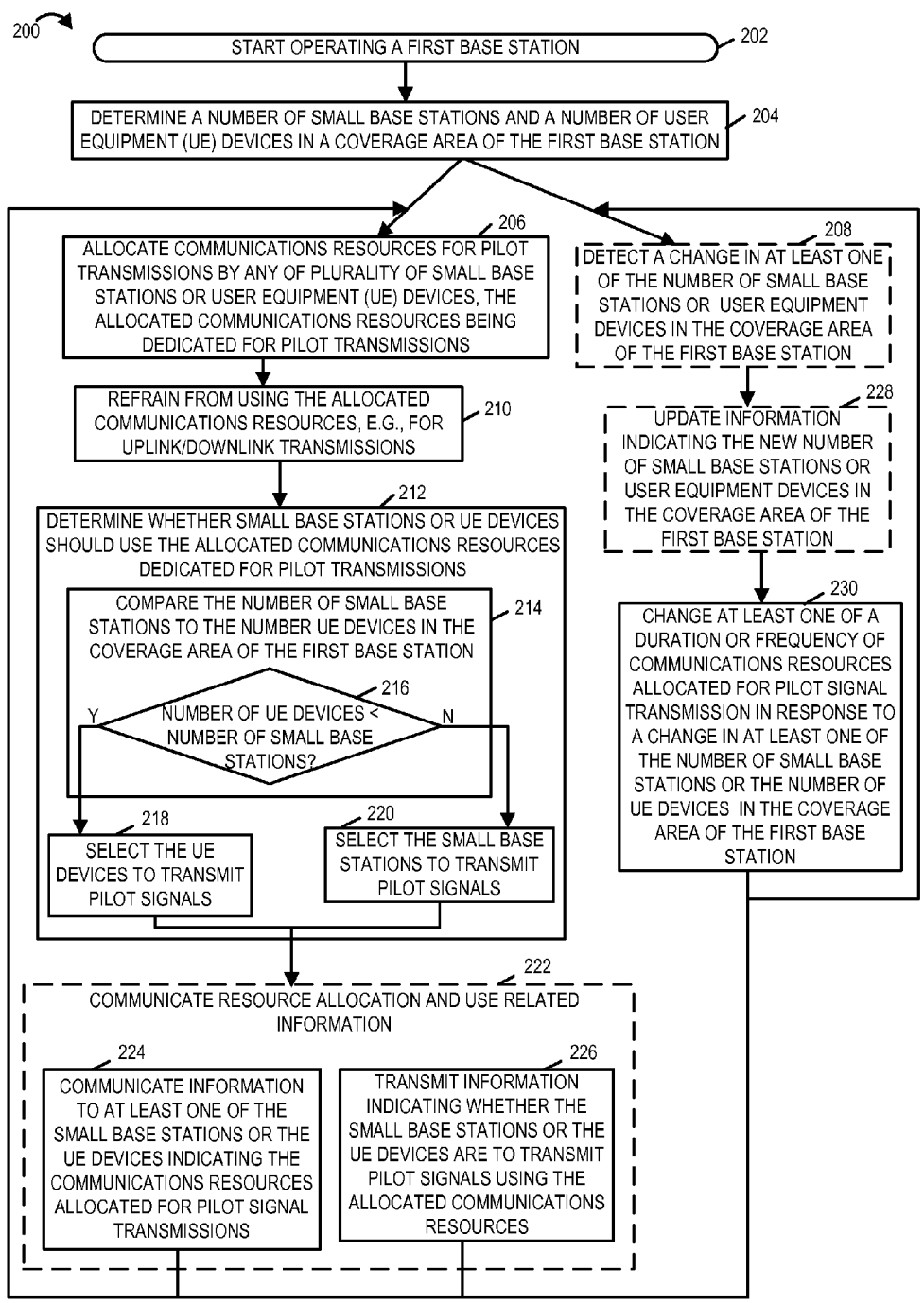
FIG. 2 is a flowchart illustrating an exemplary method of operating a first base station of the system shown in FIG. 1, in accordance with one exemplary embodiment.
Figures 5, 5A:
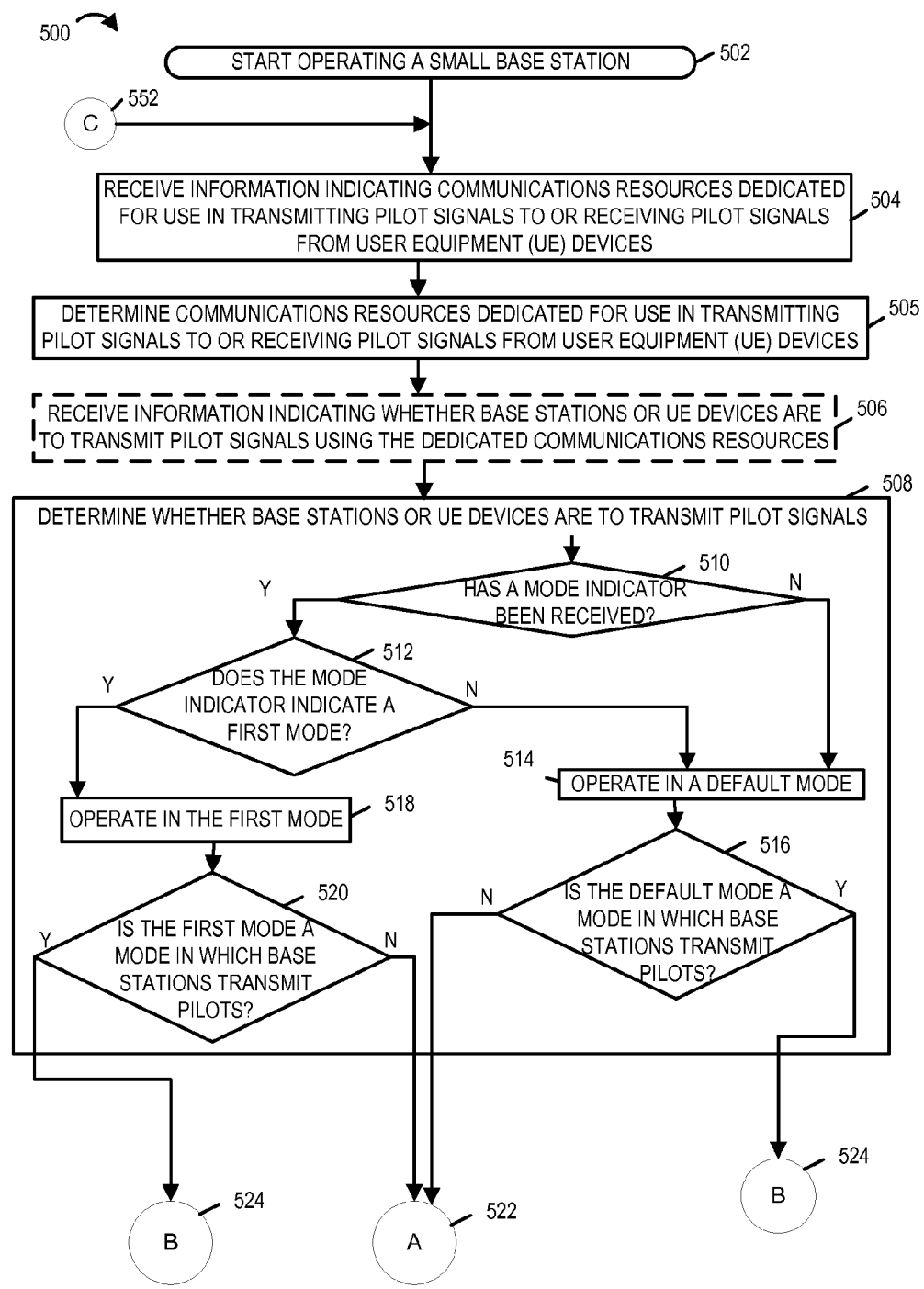
FIG. 5, which comprises a combination of FIGS. 5A and 5B, is a flowchart illustrating an exemplary method of operating a base station of the system shown in FIG. 1, in accordance with one exemplary embodiment.
Figure 5B:
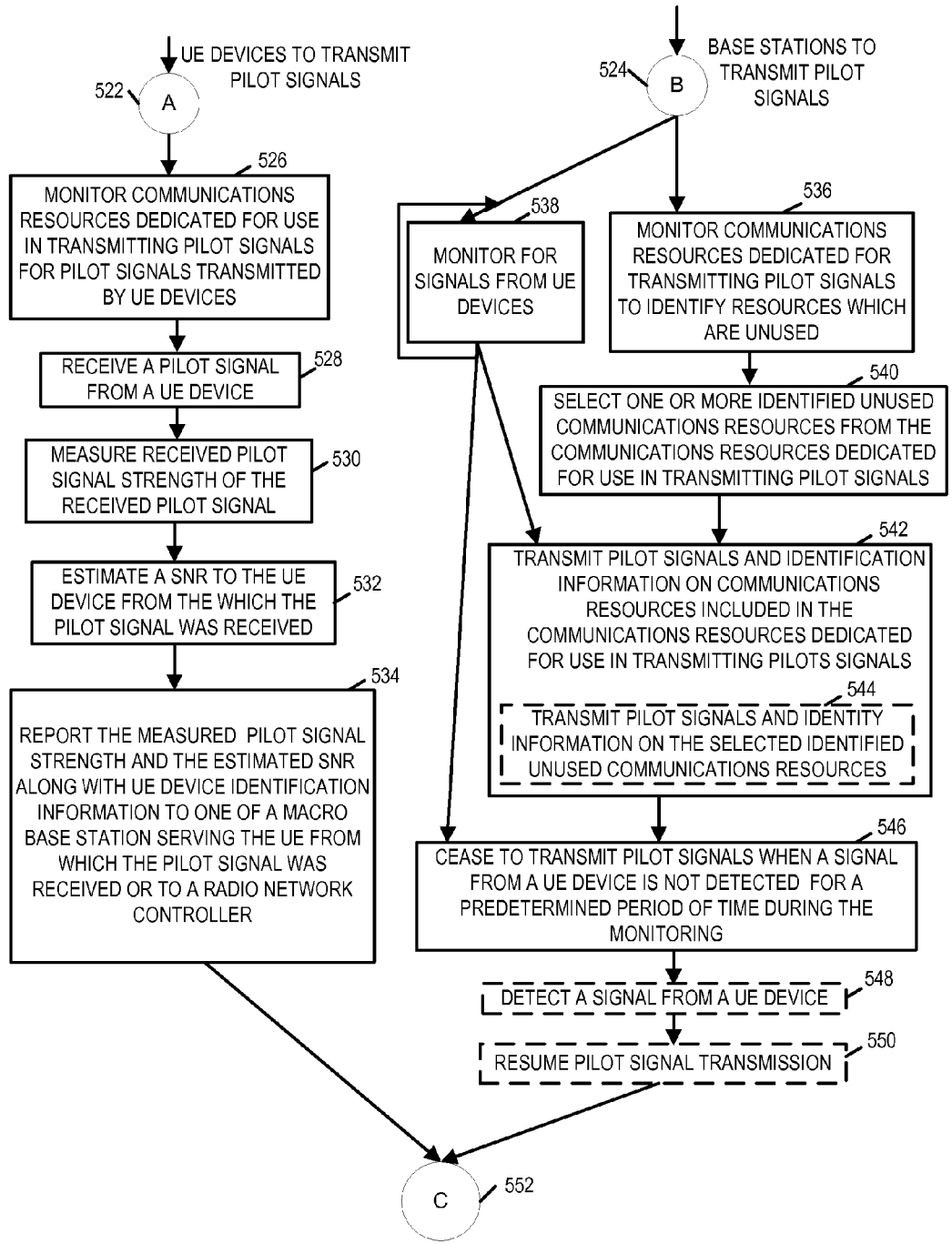
Figures 9, 9A:
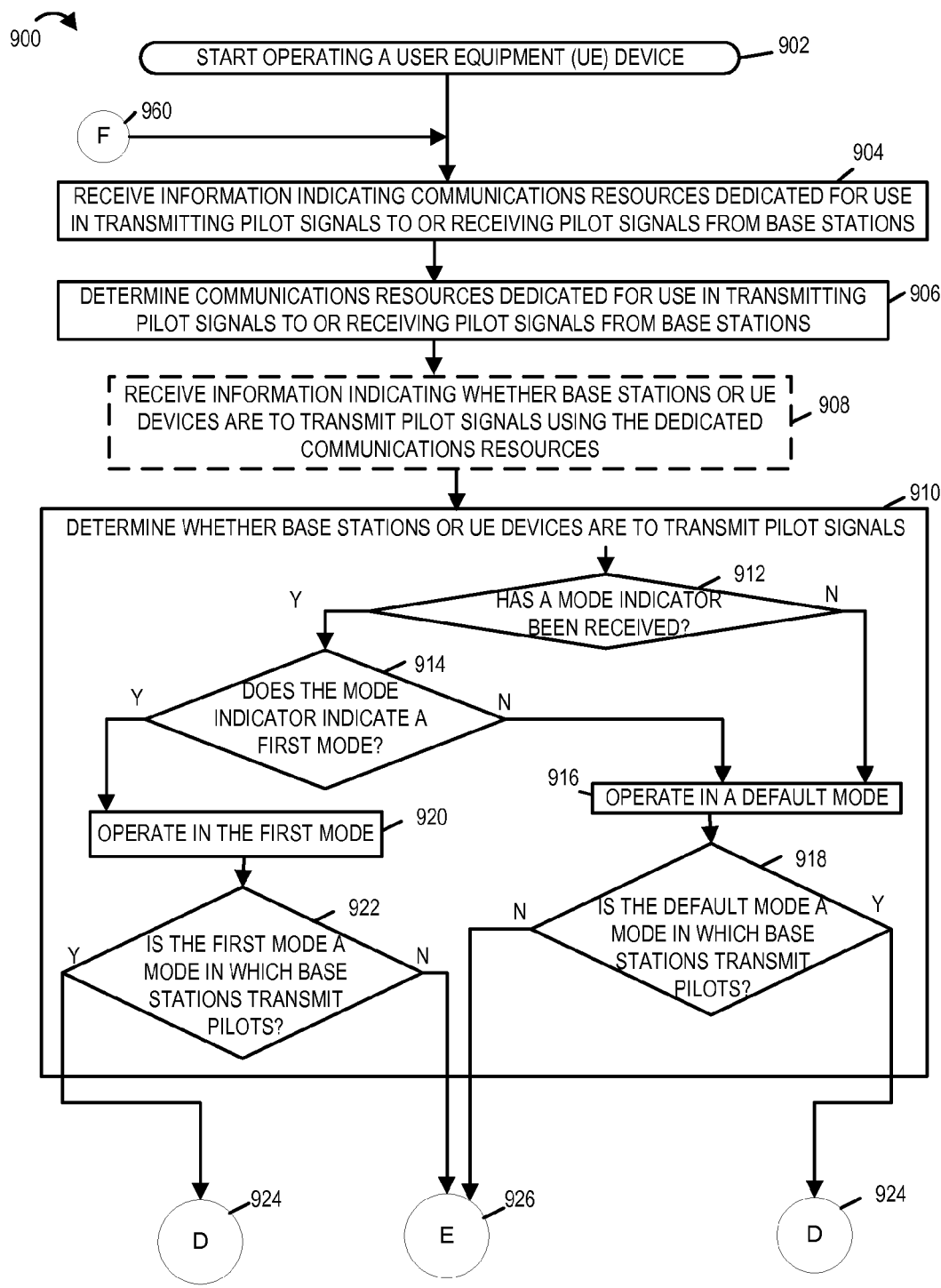
FIG. 9, which comprises a combination of FIGS. 9A and 9B, is a flowchart illustrating an exemplary method of operating a user equipment device of the system shown in FIG. 1, in accordance with one exemplary embodiment.
Figure 9B:
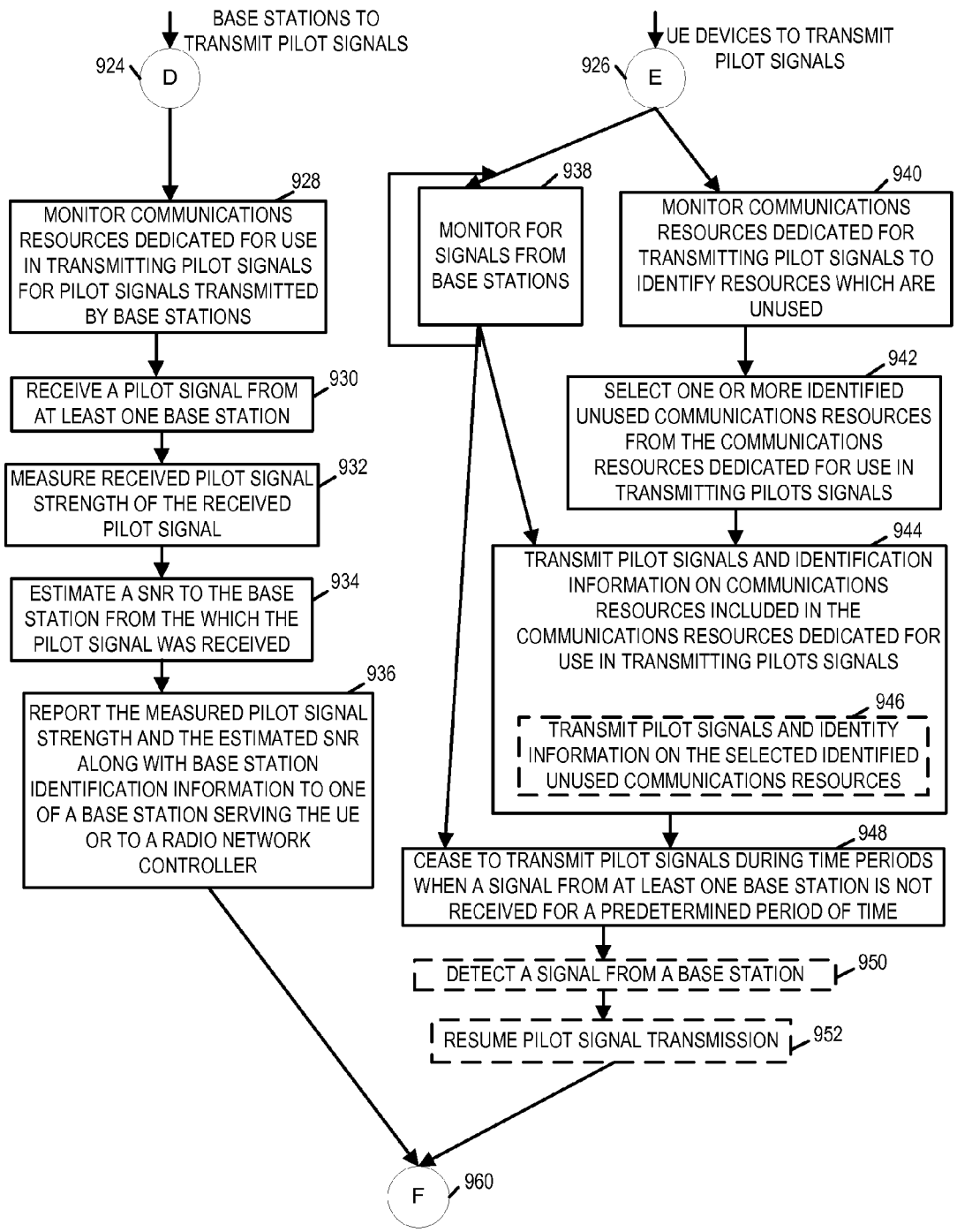

While some examples discussed above have been used to describe various features, the method used in some embodiments will become even clearer when considered in view of the flow charts shown in FIGS. 2, 5 and 9.

FIG. 2 is a flowchart 200 showing the steps of an exemplary method of operating a first base station, e.g., a macro base station, corresponding to a cell having a coverage area in which a small base station is located, in accordance with an exemplary embodiment. In some embodiments the first base station implementing the method of flowchart 200 is e.g., the macro base station 124 shown in FIG. 1. The first base station 124 may, and in some embodiments is, implemented as an eNodeB. For the purposes of discussion consider that BS 124 is the first base station implementing the method of flowchart 200. In some embodiments the small base station is a femtocell or a picocell. In some embodiments the small base station has a coverage area less than one half the coverage area of the first base station.

Operation starts in step 202. In step 202 the first base station is powered on and initialized. Operation proceeds from start step 202 to step 204. In step 204 the first base station determines a number of small base stations and a number of active user equipment (UE) devices in a coverage area of the first base station, e.g., cell 1 161 shown in FIG. 1. In some embodiments, the information indicating the determined number of small base stations and a number of active user equipment (UE) devices in a coverage area of the first base station is stored by the first base station, e.g., in memory. It should be noted that some of the active UE devices may not be attached to the first base station and may be attached to some of the plurality of small base stations in the coverage of the first base station.

Following the determination of the number of small base stations and active UEs operating in the coverage area, in some embodiments the first base station dedicates a group of periodic communications resources for pilot transmissions by devices in the coverage area of the first base station. Operation proceeds from step 204 to steps 206 and 208 which may be, and in some embodiments are, performed asynchronously. In step 206, the first base station 124 allocates communications resources for pilot transmissions by any of a plurality of small base stations or UE devices, the allocated communications resources being dedicated for pilot transmissions, the small base station being one of the plurality of small base stations. Operation proceeds from step 206 to step 210 where the first base station refrains from using the allocated communications resources to transmit signals and/or for other purposes, e.g., first base station does not use/assign the allocated resources for any other uplink/downlink communications. Thus in some embodiments the first base station refrains from scheduling data transmissions (e.g., by UE devices) in the allocated communications resources.

The communications resources for pilot transmissions may be, and in some embodiments are, allocated in different carriers or across a set of carriers to allow for wide band pilot signal transmissions. Thus, a receiving device can make a reasonable estimate of interference across the set of frequencies the transmissions of the device transmitting the pilot signal(s) is likely to encounter as well as make received signal strength measurements, such as SNR measurements for multiple frequencies. While the pilots may be wideband, the communication resources dedicated for their transmission will normally correspond to the frequency band the transmitting device uses for transmission purposes. For example in some embodiments the communications resources are allocated, when small base stations are to transmit pilots, in a frequency band in which the small cells transmit, e.g., in a downlink frequency band. However, when UE's are to transmit pilots, the macro base station 124 allocates the communications resources to be used for UE pilot signal transmissions in the frequency band in which the UEs transmit, e.g., uplink frequency band. Thus, in frequency division duplex (FDD) systems where uplink and downlink use separate frequency bands, the frequency band in which the macro base station 124 allocates resources for non-macro base station pilot signal transmissions will vary depending on whether UEs or small base stations are to transmit pilots. In time division duplex (TDD) systems where uplink and downlink use the same frequency bands at different times, the time period in which resources are allocated for pilot signal transmissions will vary depending on whether small base stations are to transmit pilots or UEs are to transmit pilots. In a TDD system resources will be dedicated in the downlink transmission time period when small base stations are to transmit pilots while pilot signal transmission resources during the uplink time period will be allocated by the macro base station 124 when UE devices are to transmit pilots. In some embodiments the macro base station may allocate the same set of resources for pilot transmissions irrespective of whether small base stations or UE devices are to transmit pilot signals.

In some embodiments, when resources are allocated in the uplink band for UE pilot transmissions, the macro base station and small base stations refrain from using the allocated communications resources for any other purposes, e.g., they do not assign the allocated resources from the uplink band for any other uplink communications. Similarly, in some embodiments when resources are allocated in the downlink band for pilot transmission by small base stations, the macro base station 124 and small base stations refrain from using the allocated communications resources from the downlink band for any other purposes other than transmitting pilot signals and related information, e.g., device identification information that is transmitted with the pilot signals.

Operation proceeds from step 210 to step 212. In step 212 the first base station determines whether the small base stations or the UE devices in the coverage area should use the allocated communications resources dedicated for pilot transmissions. In various embodiments, as part of performing step 212, one or more of the steps 214, 216, 218 and 220 are performed. In accordance with one aspect, the decision whether the small base stations or the UEs in the coverage area of the first base station should use the allocated resources for transmitting pilot signals at a given time depends on the number of the small base stations and the number of active UE devices in the coverage area at the given time. Accordingly, the first base station makes this determination based on the knowledge of the number of the small base stations and active UE devices in the coverage area at that time. Thus as illustrated in step 214, the first base station compares the number of small base stations to the number of active UE devices in the coverage area of the first base station. The decision as to which devices should be selected to transmit pilot signals is made in step 216, which is performed as part of step 214, and the selection is made according to the decision. If the number of active UE devices is less than the number of small base stations in the coverage area of the first base station, then step 218 is performed wherein the first base station selects the UE devices to transmit the pilot signals. If the number of small base stations is less than the number of active UE devices in the coverage area of the first base station, then step 220 is performed where the first base station selects the small base stations to transmit the pilot signals.

Figure 12:
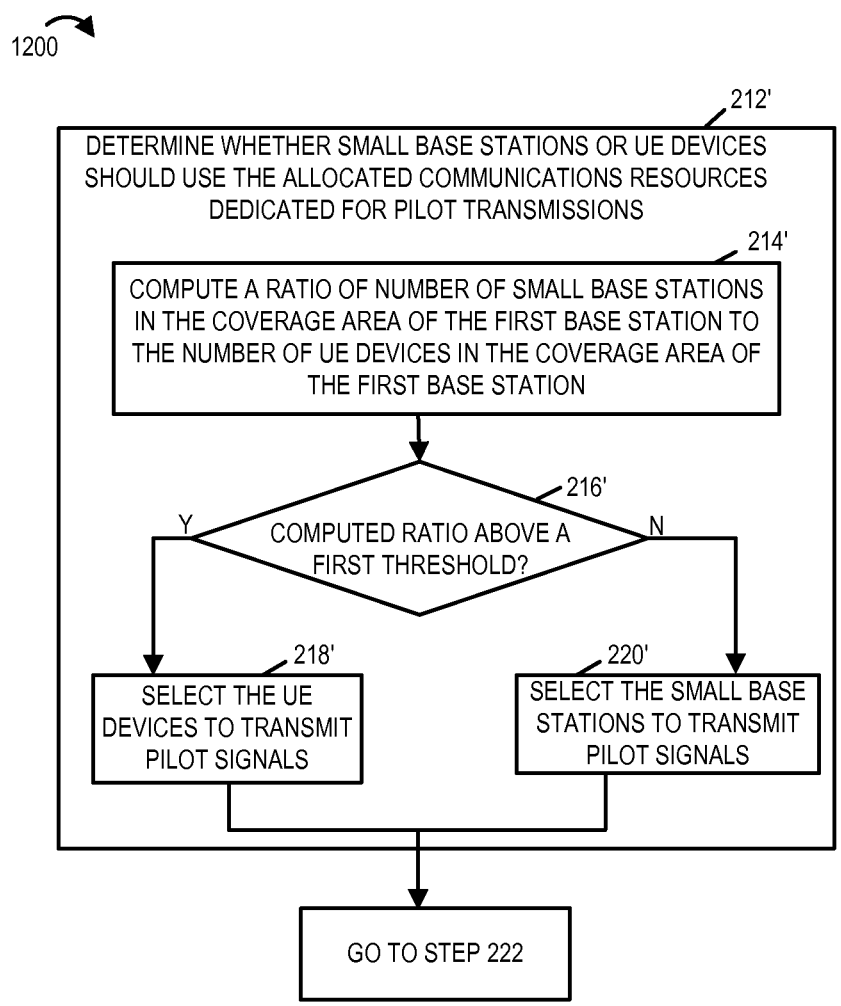
FIG. 12 illustrates a set of steps used in some embodiments to determine whether base stations or UE devices are to transmit pilot signals using communications resources dedicated for use in sending pilot signals.

In an alternative embodiment, step 212' illustrated in FIG. 12 is performed in place of step 212. Referring to FIG. 12, as illustrated in drawing 1200, in step 212' the first base station determines whether the small base stations or the UE devices in the coverage area should use the allocated communications resources dedicated for pilot transmissions. In the illustrated embodiment, as part of performing step 212', one or more of the steps 214', 216', 218' and 220' are performed. As illustrated in step 214', the first base station computes a ratio of the number of small base stations devices in the coverage area of the first base station to the number of active UE devices in the coverage area of the first base station. Next in step 216' a comparison is made to determine if the computed ratio is above a first threshold. If the computed ratio is above the first threshold, then step 218' is performed wherein the first base station selects the UE devices to transmit the pilot signals. If the computed ratio is below the first threshold, then step 220' is performed where the first base station selects the small base stations to transmit the pilot signals.

Operation proceeds from step 212 (or step 212' depending on the embodiment) to step 222. In step 222 the first base station communicates resource allocations and use related information, e.g., to at least one of the small base stations or the UE devices. In some embodiments steps 224 and 226 are individually performed as part of step 222. In step 224 the first base station communicates information to at least one small base station or a UE device indicating the communications resources allocated for pilot signal transmissions. In step 226 the first base station transmits information indicating a decision whether the small base stations or UE devices are to transmit the pilot signals using the allocated communications resources. In some embodiments the information regarding the allocated resources indicated in step 224 and the information regarding the decision indicated in step 226 is transmitted in a single message while in some embodiments the information is communicated via separate individual messages from the first base station. Operation proceeds from steps 224 and 226 back to step 206.

Returning now to step 208, in various embodiments following the initial determination of the number of small base stations and active UE devices in the coverage area of the first base station, the first base station monitors to detect any change in the determined number of small base stations or active UE devices in its the coverage area, e.g., on an ongoing basis. In step 208 the first base station detects a change in at least one of the number of small base stations or active UE devices in the coverage area of the first base station. Operation proceeds from step 208 to step 228. In step 228 the first base station updates the information indicating the number of small base stations and the number of active user equipment (UE) devices in the coverage area of the first base station, e.g., based on the detected change in the number of devices. Thus the updated information reflects a new number of small base stations and the number of active user equipment (UE) devices in the coverage area of the first base station.

Operation proceeds from step 228 to step 230. In step 230 the first base station changes at least one of a duration or frequency of resources allocated for pilot signal transmission in response to a change in at least one of the number of small base stations or the number of active user equipment (UE) devices in the coverage area of the first base station. Thus in various embodiments the first base station changes at least one characteristic corresponding to the communications resources allocated for pilot transmissions based on the detected change in the number of small base stations or the active UE devices in the coverage area of the first base station. For example in some embodiments when it is determined that the number of small base stations exceeds the number of active UEs in the coverage area, the communications resources are allocated for uplink communication in an uplink frequency band in which the active UEs transmit pilot signals and device identification information via the allocated resources and the small cells receive via the allocated resources. In some other embodiments, when the number of UE devices exceeds the number of small base stations in the coverage area the communications resources are allocated for downlink communication in a downlink frequency band in which the small base stations transmit pilot signals and identification information via the allocated resources and the UEs receive via the resources.

Operation proceeds from step 230 back to steps 206 and 208 and the operation continues in this manner. In various embodiments steps 208, 228 and 230 are performed on an ongoing basis. Thus when a change in at least one of the number of small base stations or active UE devices in the coverage area is detected, information indicating the number of devices is updated and the first base station changes at least one of a duration or frequency of resources allocated for pilot signal transmission in response as discussed above.

It should be appreciated that in some embodiments in the next iteration, updated information indicating the new number of small base stations and the number of active user equipment (UE) devices in the coverage area of the first base station is used to repeat steps 212 and 222.

Figure 3:
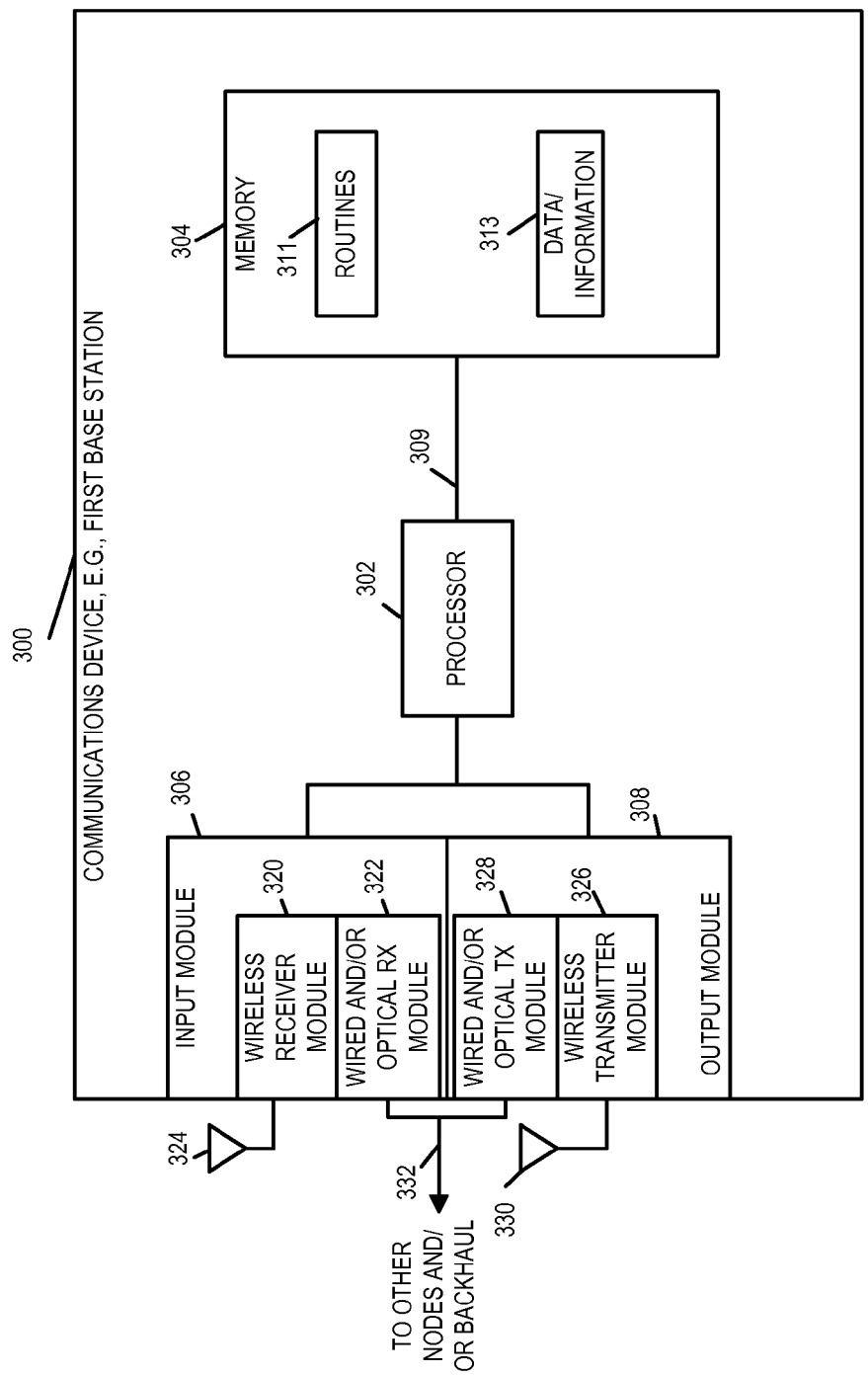
FIG. 3 illustrates an exemplary first base station, e.g., eNodeB, which can be used as the macro base station shown in the exemplary system of FIG. 1.

FIG. 3 is a drawing of an exemplary communications device 300, e.g., a first base station, in accordance with various embodiments. Exemplary first base station 300 can be used as the base station 124, shown in system 100 of FIG. 1. Exemplary first base station 300 can, and sometimes does, allocate communications resources to the small base stations and/or the UE devices in the coverage area of the base station 300 for pilot signal transmissions. The first base station 300 may, and sometimes does, implement a method in accordance with flowchart 200.

The first base station 300 includes a processor 302 and memory 304 coupled together via a bus 309 over which the various elements (302, 304) may interchange data and information. The first base station 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wireless receiver module 320 for receiving input including over wireless communications links. Input module 306 also includes a wired and/or optical input receiver module 322 for receiving input over a wired and/or optical link. Output module 308 includes a wireless transmitter module 326 for transmitting output signals over wireless communications links. Output module 308 also includes a wired and/or optical output transmitter module 328 for transmitting output signals over a wired and/or optical link. Memory 304 includes routines 311, and data/information 313.

The first base station 300 further includes wireless communications receive antenna 324 coupled to wireless receiver module 320 and wireless communications transmit antenna 330 coupled to wireless transmitter module 326. In some embodiments, the same antenna is used for both input and output wireless communications signaling. The wired and/or optical receiver module 322 and the wired and/or optical transmitter module 328 are coupled to other nodes and/or a backhaul via link 332.

In various embodiments, processor 302 is configured to determine a number of small base stations and a number of user equipment (UE) devices in a coverage area of the first base station, and store the information indicating the determined number of small base stations and a number of user equipment (UE) devices in a coverage area of the first base station, e.g., in the memory 304.

In various embodiments, processor 302 is configured to dedicate some communications resources, e.g., set aside from the available communications resources, for pilot transmissions by devices in the coverage area of the first base station. In various embodiments the processor 302 is further configured to allocate communications resources for pilot transmissions by any of a plurality of small base stations or UE devices, the allocated communications resources being dedicated for pilot transmissions, and refrain from using the allocated communications resources for any other purposes, e.g., the processor 302 controls the first base station to not use/assign the allocated resources for any other uplink/downlink communications.

In various embodiments the processor 302 is further configured to determine whether the small base stations or the UE devices in the coverage area should use the allocated communications resources dedicated for pilot transmissions, e.g., at a given time. In various embodiments, as part of being configured to determine whether the small base stations or the UEs in the coverage area of the first base station should use the allocated resources for transmitting pilot signals at a given time, the processor 302 is further configured to compare the number of small base stations to the number of UE devices in the coverage area of the first base station, decide as to which device should be selected to transmit pilots signals and which one to receive the pilot signals based on the comparison. The processor 302 is further configured to: select the UE devices to transmit the pilot signals when the comparison indicates that the number of UE devices is less than the number of small base stations in the coverage area of the first base station 300, and select the small base stations to transmit the pilot signals if the number of small base stations is less than the number of UE devices in the coverage area of the first base station.

In various embodiments the processor 302 is further configured to control the first base station 300 to communicate (e.g., transmit via output module 308) resource allocations and use related information, e.g., to at least one of the small base stations or the UE devices. In some embodiments the processor is configured, as part of being configured to communicate resource allocations and use related information, to communicate (e.g., transmit via output module 308) information to at least one small base station or a UE device indicating the communications resources allocated for pilot signal transmissions, and transmit information indicating a decision whether the small base stations or UE devices are to transmit the pilot signals using the allocated communications resources. In some embodiments the processor 302 is configured to control the output module 308, e.g., transmitter 326, to transmit the information regarding the allocated resources and the information regarding the decision whether the small base stations or UE devices are to transmit the pilot signals, in a single message while in some other embodiments the processor 302 is configured to control the transmitter to communicate such information via separate individual messages from the first base station 300.

In some embodiments the processor 302 is further configured to monitor to detect any change in the number of small base stations or UE devices in its the coverage area, e.g., on an ongoing basis, and update the information indicating the number of small base stations and the number of user equipment (UE) devices in the coverage area of the first base station when a change in the number of devices is detected. Thus in some embodiments the processor 302 updates the previously stored information to reflect the new number of small base stations and the number of user equipment (UE) devices in the coverage area of the first base station 300. In some embodiments the processor 302 is further configured to change at least one of a duration or frequency of resources allocated for pilot signal transmission in response to a change in at least one of the number of small base stations or the number of user equipment (UE) devices in the coverage area of the first base station.

In various embodiments the processor 302 is configured to control the operation of the first base station and perform one or more steps on an ongoing basis using the updated information indicating the number of small base stations and UE devices in the coverage area of the first base station 300. For example in some embodiments the processor 302 is further configured to repeat, using updated information indicating the new number of small base stations and the number of user equipment (UE) devices in the coverage area of the first base station, the following operations: determine whether small base stations or UE devices should use said allocated communications resources for pilot signal transmissions; and transmit information indicating whether the small base stations or UE devices are to transmit pilot signals using said allocated communications resources. In various embodiments the first base station 300 is a macro base station. In various embodiments a small base station is a femtocell or picocell. In some embodiments at least some of the small base stations have a coverage area less than one half the coverage area of the first base station 300.

Figure 4:
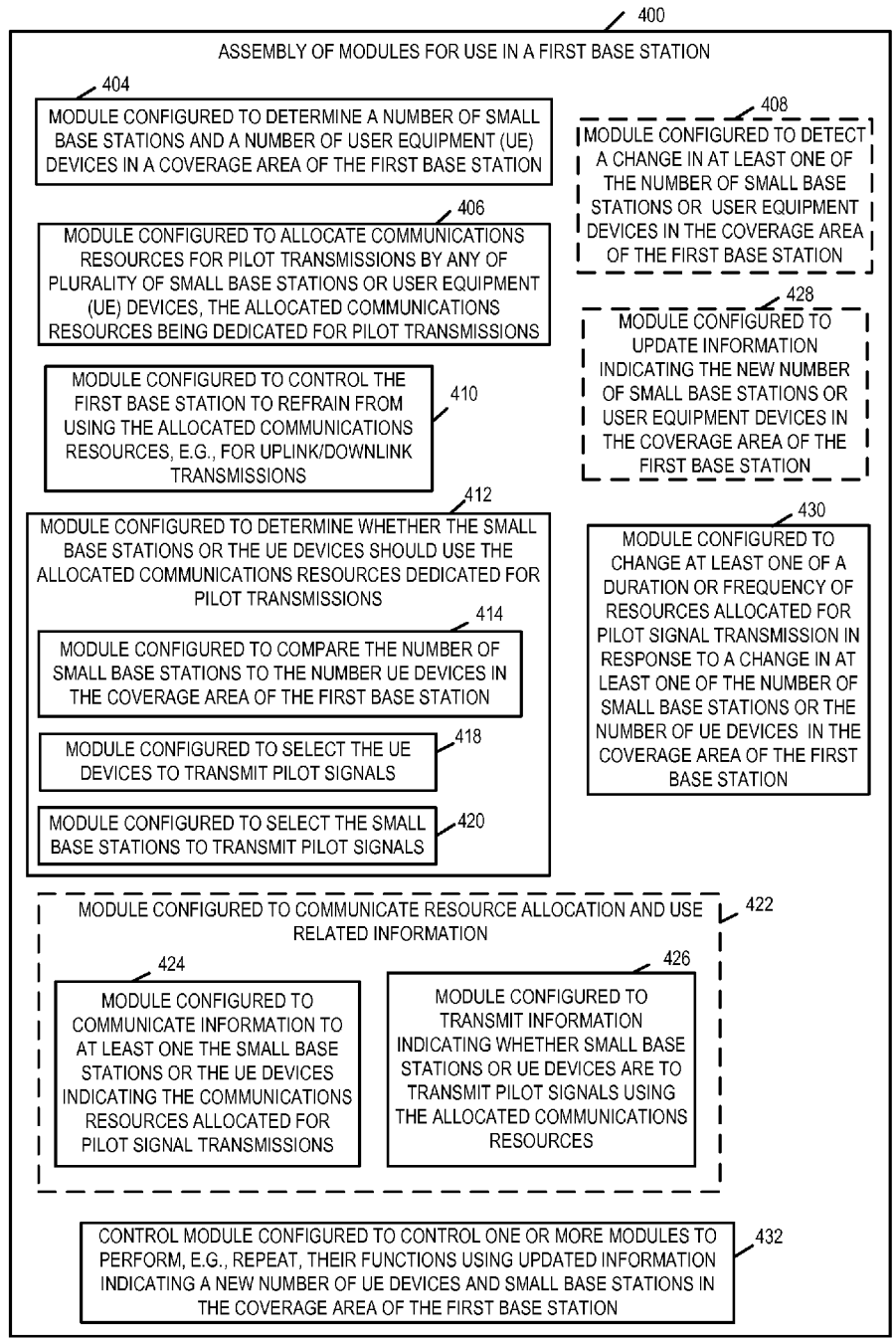
FIG. 4 illustrates an assembly of modules which can be used in the exemplary first base station shown in FIG. 3.

FIG. 4 is an assembly of modules 400 which can, and in some embodiments is, used in the exemplary first base station 300 illustrated in FIG. 3. The modules in the assembly 400 can, and in some embodiments are, implemented in hardware fully within the processor 302 of FIG. 3, e.g., as individual circuits. In other embodiments some of the modules are implemented, e.g., as circuits, within the processor 302 with other modules being implemented, e.g., as circuits, external to and coupled to the processor. As should be appreciated the level of integration of modules on the processor and or with some modules being external to the processor may be one of design choice. In some but not necessarily all embodiments modules 404, 406, 408, 410, 412, 414, 418, 420, 428, 430, and 432 are implemented in the processor with the other modules being implemented in the processor and/or external to the processor 302.

Alternatively, rather than being implemented as circuits, all or some of the modules may be implemented in software and stored in the memory 304 of the first base station 300 shown in FIG. 3 with the modules controlling operation of the first base station 300 to implement the functions corresponding to the modules when the modules are executed by a processor, e.g., processor 302. In some such embodiments, the assembly of modules 400 is included in routines 311 of memory 304 of device 300 of FIG. 3. In still other embodiments, various modules are implemented as a combination of hardware and software, e.g., with a sensor or another circuit external to the processor 302 providing input to the processor 302 which then under software control operates to perform a portion of a module's function.

While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, the processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first base station 300 or elements therein such as the processor 302, to perform the functions of the corresponding steps illustrated and/or described in the method of flowchart 200 of FIG. 2.

Assembly of modules 400 includes a module 404 configured to determine a number of small base stations and a number of user equipment (UE) devices in a coverage area of the first base station, a module 406 configured to allocate communications resources for pilot transmissions by any of a plurality of small base stations or UE devices, the allocated communications resources being dedicated for pilot transmissions, a module 408 configured to monitor and detect any change in the number of small base stations or UE devices in its the coverage area, and a module 410 configured to control the first base station to refrain from using the allocated communications resources to transmit signals and/or for other purposes, e.g., the module 410 controls the first base station 300 to not use/assign the allocated resources for any other uplink/downlink communications. Thus in some embodiments the module 410 control the first base station to refrain from scheduling data transmissions (e.g., by UE devices) in the allocated communications resources.

In various embodiments the assembly of modules 400 further includes a module 412 configured to determine whether the small base stations or the UE devices in the coverage area should use the allocated communications resources dedicated for pilot transmissions. In various embodiments, the module 412 includes a module 414 configured to compare the number of small base stations to the number of UE devices in the coverage area of the first base station and decide as to which device should be selected to transmit pilots signals and which one to receive the pilot signals based on the comparison, a module 418 configured to select the UE devices to transmit the pilot signals when the comparison indicates that the number of UE devices is less than the number of small base stations in the coverage area of the first base station 300, and a module 420 configured to select the small base stations to transmit the pilot signals if the number of small base stations is less than the number of UE devices in the coverage area of the first base station.

In various embodiments the assembly of modules 400 further includes a module 422 configured to communicate resource allocations and use related information, e.g., to at least one of the small base stations or the UE devices. In some embodiments the module 422 includes a module 424 configured to communicate, e.g., transmit via output module 308, information to at least one of the small base stations or the UE devices indicating the communications resources allocated for pilot signal transmissions, and a module 426 configured to transmit, e.g., via output module 308, information indicating a decision whether the small base stations or UE devices are to transmit the pilot signals using the allocated communications resources.

In some embodiments the assembly of modules 400 further includes a module 428 configured to update the information indicating the number of small base stations and the number of user equipment (UE) devices in the coverage area of the first base station when a change in the number of devices in the coverage area of the first base station is detected, and a module 430 configured to change at least one of a duration or frequency of communications resources allocated for pilot signal transmission in response to a change in at least one of the number of small base stations or the number of user equipment (UE) devices in the coverage area of the first base station 300.

In some embodiments the assembly of modules 400 further includes a module 432 configured to control the operation of the first base station 300 by controlling one or more modules in the assembly of modules 400 to perform their functions using the updated information indicating a new updated number of small base stations and UE devices in the coverage area of the first base station 300. For example in some embodiments the module 432 controls the module 412 to repeat the determination operation to determine whether the small base stations or the UE devices should use said allocated communications resources for pilot signal transmissions using updated information indicating the new number of small base stations and the number of user equipment (UE) devices in the coverage area of the first base station, and control the module 426 to transmit information indicating whether the small base stations or UE devices are to transmit pilot signals using said allocated communications resources.

FIG. 5 is a flowchart 500 showing the steps of an exemplary method of operating a small base station, e.g., a femtocell or a picocell, in accordance with an exemplary embodiment. In some embodiments the base station implementing the method of flowchart 500 is any one of the base stations 112, 114, 116, . . . , or 120 shown in FIG. 1. For the purposes of discussion consider that base station 112 device implements the method of flowchart 500.

Operation starts in step 502. In step 502 the base station 112 is powered on and initialized. Operation proceeds from start step 502 to step 504. In step 504 the base station receives information indicating communications resources that are dedicated for use in transmitting pilot signals to or receive pilot signals from user equipment (UE) devices, e.g., from a macro base station such as base station 124. In some embodiments step 504 is not performed and the information indicating communications resources that are dedicated for use in transmitting pilot signals may be pre-stored in the base station implementing the method of flowchart 500.

Operation proceeds from step 504 to step 505. In step 505 the base station determines the communications resources dedicated for use in transmitting pilot signals to or receive pilot signals from UE devices. The determination is made, e.g., based on the received information or the previously stored information indicating the resources dedicated for use in transmitting or receiving pilot signals as discussed above.

Operation proceeds from step 505 to step 506 which is optional. In step 506 the base station receives information indicating whether base stations are to transmit pilot signals using the dedicated communications resources or UE devices are to transmit pilot signals using the dedicated communications resources. The information is received e.g., from a macro base station or a central control node in some embodiments. In some embodiments the received information includes a mode indicator which indicates to the base station whether the base stations or the UE devices are to transmit pilot signals using the dedicated communications resources. In some embodiments the mode indicator indicates that the base station is to operate in a mode in which the base stations are to transmit pilot signals using the dedicated communications resources.

In some embodiments when no such information indicating whether the base stations or the UE devices are to transmit pilot signals using the dedicated communications resources is received, the base station operates in a default mode which can be pre-configured in some embodiments. For example, in some embodiments in the default mode the base stations are to transmit pilot signals using the dedicated communications resources. In some other embodiments, in the default mode the UE devices are to transmit pilot signals using the dedicated communications resources. In some embodiments the default mode of the base station can be changed, e.g., based on an instruction received from a macro base station and/or a user input.

Operation proceeds from step 506 to step 508. In step 508 the base station determines, e.g., using the received information indicating which devices (e.g., base stations or UEs) are to transmit pilot signals, whether the base stations or UE devices are to transmit pilot signals using the dedicated communications resources. In various embodiments, as part of determining step 508, one or more of steps 510, 512, 514, 516, 518 and 520 are performed. In sub-step 510 the base station determines if a mode indicator has been received, e.g., as part of the received information included in a received wireless signal transmitted by the macro base station. If it is determined that a mode indicator has not been received, the operation proceeds to sub-step 514. If in step 510 it determined that a mode indicator has been received, the operation proceeds to sub-step 512 where it determined if the received mode indicator indicates a first mode of operation. If it is determined that the mode indicator does not indicate the first mode, operation proceeds from sub-step 512 to sub-step 514 where the base station operates in accordance with a default mode. The base station implementing the method may, and in some embodiments does, store information indicating whether the default mode is one in which base stations are to transmit pilot signals or UE devices are to transmit pilot signals. The macro base station may signal, and in some embodiments does signal, to the small base stations and UE devices what the default mode is to be set to. In such embodiments the receiving devices receive the information and set the default mode to that specified by the macro base station.

Operation proceeds from sub-step 514 to sub-step 516 where the base station determines if the default mode is set to a mode in which base stations are to transmit pilot signals using the dedicated communications resources. If it determined that the default mode is set to a mode in which base stations are to transmit pilot signals the operation proceeds to steps 536 and 538 via connecting node B 524, otherwise the operation proceeds to step 526 via connecting node A 522.

Referring again to step 512, if in step 512 it is determined if the received mode indicator indicates a first mode, the operation proceeds from sub-step 512 to sub-step 518 where the base station operates in accordance with the first mode. Operation proceeds from sub-step 518 to sub-step 520 where the base station determines if the first mode is set to a mode in which base stations are to transmit pilot signals. If in step 520 it is determined that the first mode is set to a mode in which base stations are to transmit pilot signals the operation proceeds to steps 536 and 538 via connecting node B 524, otherwise it is considered that the first mode is set to a mode in which UE devices are to transmit pilot signals and the operation proceeds to step 526 via connecting node A 522. In various embodiments the default mode and the first mode are different and can be set/controlled by, e.g., the macro base station that allocates the dedicated communications resources for pilot transmissions, or by the control entity, e.g., control node 130. In some embodiments in the first mode the UE devices are to transmit pilot signals using the dedicated communications resources.

Thus, depending on whether the base stations or the UE devices are to transmit pilot signals, the operation proceeds along one of two possible processing paths as illustrated.

Consider processing path that continues through node A 522. As discussed above, before reaching this processing point at connecting node A 522 it has been determined that UE devices are to transmit pilot signals. In step 526 the base stations starts monitoring communications resources, dedicated for use in transmitting pilot signals, for pilot signals transmitted by UE devices. Since the base station already determined (e.g., in step 508) that the UE devices are to transmit pilot signals using the dedicated resources, it infers that it is to receive pilot signals transmitted by UE devices and thus in step 526 the base station begins monitoring for pilot signal transmissions on the dedicated communications resources.

Operation proceeds from step 526 to step 528. In step 528 the base station receives a pilot signal from a UE device. Operation proceeds from step 528 to step 530. In accordance with one aspect of some embodiments, in step 530 the base station performs a measurement to measure the received signal strength of the received pilot signal from the UE device. Operation proceeds from step 530 to step 532. In step 532 the base station estimates a signal to noise ratio (SNR) to the UE device from which the pilot signal was received. Operation proceeds from step 532 to step 534. In step 534 the base station generates a measurement report including the measured pilot signal strength and the estimated SNR along with UE device identification information and sends the generated report to one of a base station serving the UE from which the pilot signal was received, e.g., macro base station 124 or to a control node, e.g., radio network controller. In some embodiments macro base station can act as a control node. Operation proceeds from step 534 back to step 504 via connecting node C 552.

Referring now to steps 536 and 538 along the other processing path that continues through node B 524. Following a determination that the base stations are to transmit pilot signals using the dedicated communications resources, in step 536 the base station monitors the communications resources dedicated for transmitting pilot signals to identify resources which are unused. In various embodiments the base station monitors the resources to detect/measure energy on the resources. In some embodiments the resources on which least amount of energy or energy below a predetermined threshold is detected are considered unused. Operation proceeds from step 536 to step 540.

Referring now to step 538, in step 538 the base station starts monitoring for signals from UE devices, e.g., to determine if one or more UE devices are present in its vicinity. If a signal from one or more UE devices is detected during the monitoring, this indicates that the one or more UE devices from which the signal is detected are present and may be in the vicinity of the base station. These signals from UE devices could be part of their cellular communication, e.g. uplink transmissions to their serving base stations or non-cellular communication, e.g. peer to peer communication. Operation proceeds from step 538 to step 542 and 546.

In step 540 the base station selects one or more identified unused communications resources from the communications resources dedicated for use in transmitting pilot signals. The base station may autonomously select the communication resource in some embodiments. In some embodiments, the communication resource selected by the base station is determined by the identity of the base station. Operation proceeds from step 540 to step 542. In step 542 the base station transmits pilot signals and identification information on communications resources included in the communications resources dedicated for use in transmitting pilot signals. In various embodiments step 542 includes step 544 in which the base station transmits pilot signals and identification information on the selected identified unused communications resources as part of transmitting the pilot signals on the communications resources included in the dedicated communications resources. In some embodiments the base station transmits pilot signals at a predetermined power. The timing used to transmit the pilot signals may be derived from the signals received from the macro base station 124. In some embodiments step 542 is performed on a periodic basis. Operation proceeds from step 542 to step 546.

In step 546 the base station ceases to transmit pilot signals on the communication resources dedicated for pilot transmissions when a signal from at least one UE device is not detected for a predetermined period of time during the monitoring operation, e.g., the monitoring illustrated in step 538. Thus in accordance with one feature, the base station stops transmitting pilot signals and identification information when it determines that UE devices are not in the vicinity as indicated by lack of detected signals from a UE device for a predetermined time during the monitoring operation. However it should be appreciated that when the base station continues to detect signals from one or more UEs during the monitoring, the base station continues to transmit the pilot signals, e.g., periodically.

Consider for example that the base station ceased to transmit pilot signals in step 546. Operation proceeds from step 546 to step 548 which is an optional step. In step 548 the base station receives a signal from a UE device. Operation proceeds from step 548 to step 550. Following the detection of a signal from a UE device, the base station again resumes the pilot signal transmission operation in step 550, e.g., as discussed in detail in step 542 and 544. Operation proceeds from step 550 back to step 504 via connecting node C 552 and the operation may continue in this manner over time.

Figure 6:
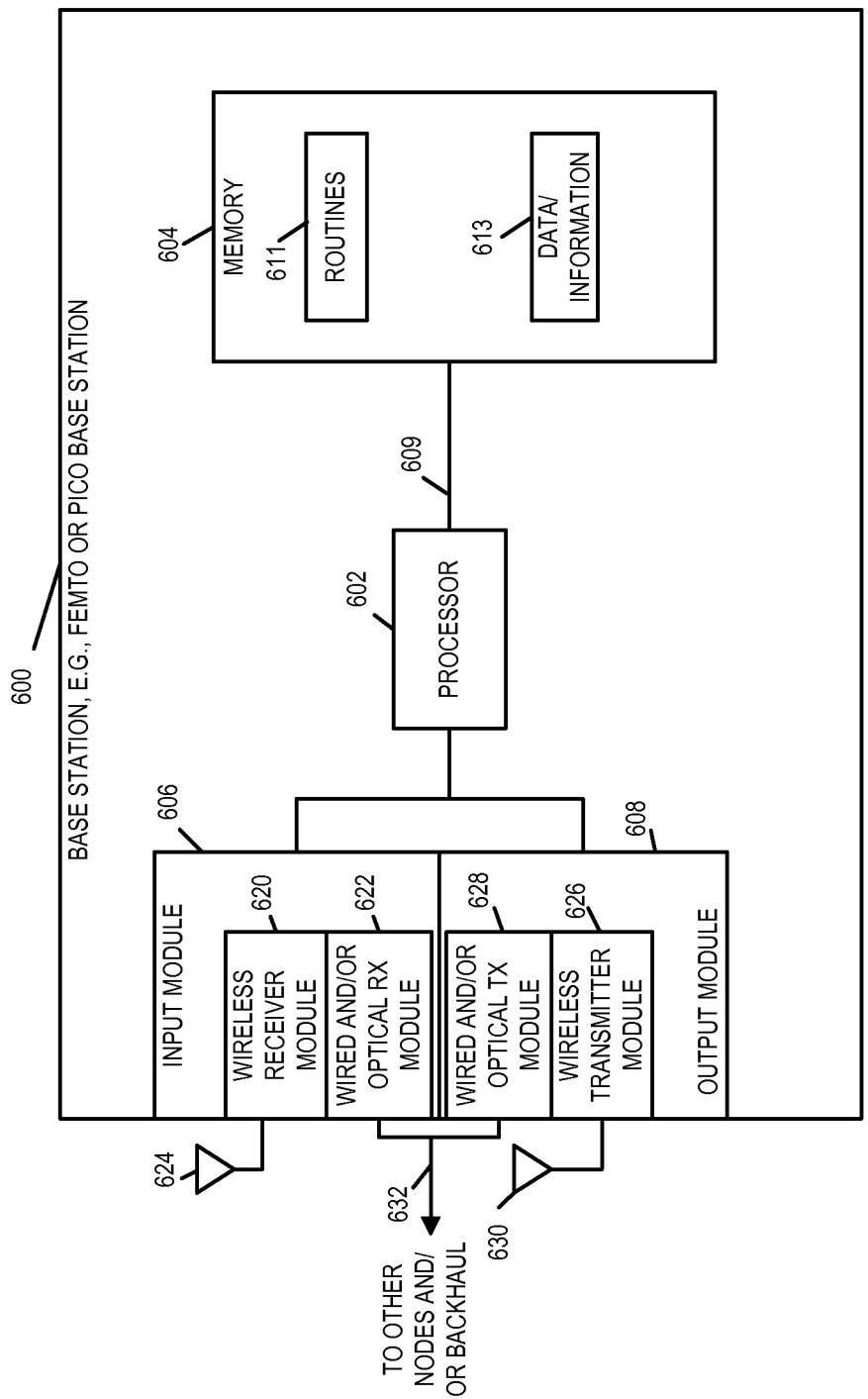
FIG. 6 illustrates an exemplary base station, e.g., femto or pico base station, station which can be used as any one of the small base stations shown in the exemplary system of FIG. 1.

FIG. 6 is a drawing of an exemplary base station 600, e.g., a small base station such as a femtocell or picocell, in accordance with various embodiments. Exemplary base station 600 can be used as any one of the base stations 112, 114, 116, ..., 120 shown in FIG. 1. Exemplary base station 600 can, and sometimes does, transmit pilot signals and identification information on the communications resources allocated for pilot signal transmissions. The base station 600 may, and sometimes does, implement a method in accordance with flowchart 500.

The base station 600 includes a processor 602 and memory 604 coupled together via a bus 609 over which the various elements (602, 604) may interchange data and information. The base station 600 further includes an input module 606 and an output module 608 which may be coupled to processor 602 as shown. However, in some embodiments, the input module 606 and output module 608 are located internal to the processor 602. Input module 606 can receive input signals. Input module 606 includes a wireless receiver module 620 for receiving input including over wireless communications links. Input module 606 also includes a wired and/or optical input receiver module 622 for receiving input over a wired and/or optical link. Output module 608 includes a wireless transmitter module 626 for transmitting output signals over wireless communications links. Output module 608 also includes a wired and/or optical output transmitter module 628 for transmitting output signals over a wired and/or optical link. Memory 604 includes routines 611, and data/information 613.

The base station 600 further includes wireless communications receive antenna 624 coupled to wireless receiver module 620 and wireless communications transmit antenna 630 coupled to wireless transmitter module 626. In some embodiments, the same antenna is used for both input and output wireless communications signaling. The wired and/or optical receiver module 622 and the wired and/or optical transmitter module 628 are coupled to other nodes and/or a backhaul via link 632.

In various embodiments, processor 602 is configured to receive information indicating communications resources that are dedicated for use in transmitting pilot signals to or receive pilot signals from user equipment (UE) devices, e.g., from a macro base station such as base station 124, determine the communications resources dedicated for use in transmitting pilot signals to or receive pilot signals from UE devices. In some embodiments the processor 602 is configured to make the determination, e.g., based on the received information or the previously stored information indicating the resources dedicated for use in transmitting or receiving pilot signals as discussed above.

In various embodiments the processor 602 is further configured to receive information indicating whether base stations are to transmit pilot signals using the dedicated communications resources or UE devices are to transmit pilot signals using the dedicated communications resources, and determine whether the base stations or UE devices are to transmit pilot signals using the dedicated communications resources. In some embodiments the received information includes a mode indicator which indicates to the base station whether the base stations or the UE devices are to transmit pilot signals using the dedicated communications resources. In some embodiments the processor 602 is configured to, as part of being configured to determine whether the base stations or UE devices are to transmit pilot signals using the dedicated communications resources, determine whether a mode indicator has been received and control the base station to operate in accordance with the indicated mode. In some embodiments when information indicating whether the base stations or UE devices are to transmit pilot signals and/or a mode indicator is not received, the processor 602 is configured to determine that the base station is to operate in a default mode. Depending on the embodiment, a default mode may be set to a mode in which either the base stations transmit pilot signals using the dedicated communications resources or the UE devices transmit pilot signals using the dedicated communications resources.

In various embodiments when it is determined that the UE devices are to transmit pilot signals using the dedicated resources, in various embodiments the processor 602 is further configured to: monitor communications resources dedicated for use in transmitting pilot signals for pilot signals transmitted by UE devices, control the base station 600 to receive a pilot signal from a UE device, perform measurements to measure the received signal strength of the received pilot signal from the UE device, estimate a signal to noise ratio (SNR) to the UE device from which the pilot signal was received, and control the base station 600 to report a pilot signal strength and an SNR estimate along with UE device identification information to one of a base station serving the UE from which the pilot signal was received or to a control node, e.g., radio network controller. As part of being configured to report, the processor 602 is configured to generate a report including a pilot signal strength, an SNR estimate and UE device identification information and send the generated report to one of a base station serving the UE from which the pilot signal was received or to the control node, e.g., radio network controller.

In various embodiments when it is determined that the base stations are to transmit pilot signals using the dedicated resources, the processor 602 is further configured to: monitor for signals from UE devices, monitor the communications resources dedicated for transmitting pilot signals to identify resources which are unused, select one or more identified unused communications resources from the communications resources dedicated for use in transmitting pilot signals, and control the base station 600 to transmit pilot signals and identification information on communications resources included in the communications resources dedicated for use in transmitting pilot signals. In some embodiments the processor 602 is configured to measure energy on the communications resources to identify the unused dedicated resources. In some embodiments the processor 602 is further configured to identify communications resources on which least amount of energy or energy below a predetermined threshold is detected as the unused communications resources. In various embodiments the processor 602 is further configured to control the base station 600 to transmit pilot signals and identification information on the selected identified unused communications resources as part of being configured to control transmission of the pilot signals on the communications resources included in the dedicated communications resources. In some embodiments the processor is configured to control the base station 600 to control transmission of the pilot signals on the selected identified resources periodically.

In some embodiments the processor 602 is further configured to control the base station 600 to cease transmitting pilot signals when a signal from at least one UE device is not detected for a predetermined period of time during the monitoring operation. In some embodiments the processor 602 is further configured to control the base station 600 to receive a signal from a UE device, and resume the pilot signal transmission operation following the detection of the signal from the UE device. Thus the processor 602 is configured to resume and continue transmitting the pilot signals, e.g., periodically, when the signals are detected from one or more UEs during the monitoring.

Figure 7:
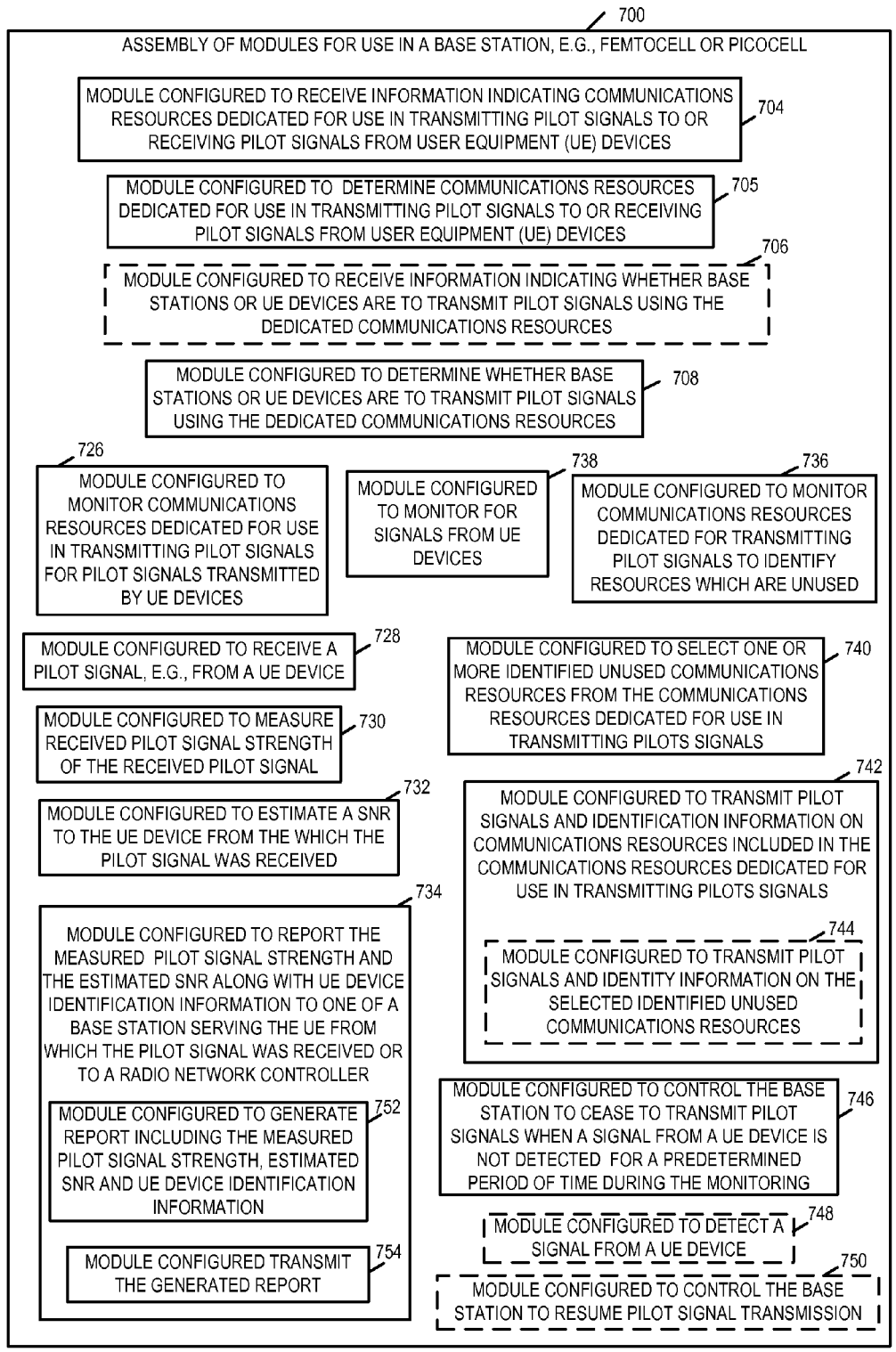
FIG. 7 illustrates an assembly of modules which can be used in the exemplary base station shown in FIG. 6.

FIG. 7 is an assembly of modules 700 which can, and in some embodiments is, used in the exemplary base station 600 illustrated in FIG. 6. The modules in the assembly 700 can be implemented in hardware within the processor 602 of FIG. 6, e.g., as individual circuits. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and/or with some modules being external to the processor may be one of design choice. In some but not necessarily all embodiments some of the modules discussed below, e.g., modules 705, 708, 726, 736, 738, 730, 732, 740, 746, 748, and 750 are implemented in the processor 602 with the other modules, e.g., modules 704, 706, 734, 742 etc., being implemented in the processor and/or external to the processor.

Alternatively, rather than being implemented as circuits, all or some of the modules may be implemented in software and stored in the memory 604 of the base station 600 shown in FIG. 6 with the modules controlling operation of small base station 600 to implement the functions corresponding to the modules when the modules are executed by a processor, e.g., processor 602. In some such embodiments, the assembly of modules 700 is included in routines 611 of memory 604 of base station 600 of FIG. 6. In still other embodiments, various modules are implemented as a combination of hardware and software, e.g., with another circuit external to the processor providing input to the processor 602 which then under software control operates to perform a portion of a module's function.

While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium, e.g., a non-transitory computer readable medium, comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the base station 600 or elements therein such as the processor 602, to perform the functions of the corresponding steps illustrated and/or described in the method of flowchart 500 of FIG. 5.

Assembly of modules 700 includes a module 704 configured to receive information indicating communications resources that are dedicated for use in transmitting pilot signals to or receive pilot signals from user equipment (UE) devices, e.g., from a macro base station, a module 705 configured to determine the communications resources dedicated for use in transmitting pilot signals to or receive pilot signals from UE devices, e.g., based on the received information or the previously stored information indicating the resources dedicated for use in transmitting or receiving pilot signals, a module 706 configured to receive information indicating whether base stations are to transmit pilot signals using the dedicated communications resources or UE devices are to transmit pilot signals using the dedicated communications resources, and a module 708 configured to determine whether the base stations or UE devices are to transmit pilot signals using the dedicated communications resources, e.g., based on the received information. In various embodiments the determination module 708 is configured to perform/implement the functions discussed in the corresponding step 508 of flowchart 500. Thus in various embodiments the module 708 is configured to determine whether a mode indicator indicating whether base stations or UE devices are to transmit pilot signals using the dedicated communications resources is received and perform one or more other determinations discussed in step 910 and/or the sub-steps therein. In some embodiments when a mode indicator is not received the determination module 708 is configured to determine that the base station 600 is to operate in a default mode. In some embodiments in the default mode the base station 600 considers that base stations are to transmit pilot signals using the dedicated communications resources. In some other embodiments in the default mode the base station 600 considers that the UE devices are to transmit pilot signals using the dedicated communications.

In various embodiments the assembly of modules 700 further includes a module 726 configured to monitor communications resources dedicated for use in transmitting pilot signals for pilot signals transmitted by UE devices, a module 736 configured to monitor the communications resources dedicated for transmitting pilot signals to identify resources which are unused, and a module 738 configured to monitor for signals from UE devices. The assembly of modules 700 in some embodiments further includes a module 728 configured to receive a pilot signal, e.g., from a UE device, a module 730 configured to perform measurements to measure the received signal strength of the received pilot signal, a module 732 configured to estimate a signal to noise ratio (SNR) to the UE device from which the pilot signal was received, and a module 734 configured to report the measured pilot signal strength and the estimated SNR along with device identification information to one of a base station serving the UE from which the pilot signal was received or to a control node, e.g., radio network controller. In some embodiments the module 734 for reporting includes a module 752 configured to generate a report including the measured pilot signal strength, estimated SNR and UE device identification information, and a module 754 configured to send, e.g., transmit, the generated report to one of a base station serving the UE from which the pilot signal was received or to the control node, e.g., radio network controller.

In various embodiments the assembly of modules 700 further includes a module 740 configured to select one or more identified unused communications resources from the communications resources dedicated for use in transmitting pilot signals, and a module 742 configured to transmit pilot signals and identification information on communications resources included in the communications resources dedicated for use in transmitting pilot signals when it is determined that the base stations are to transmit pilot signals using the dedicated resources. In some embodiments the module 742 includes a module 744 configured to transmit pilot signals and identification information on the selected identified unused communications resources as part controlling transmission of the pilot signals on the communications resources included in the dedicated communications resources. In some embodiments the module 740 is configured to measure energy on the communications resources dedicated for pilot transmissions to identify the unused dedicated resources. In some embodiments the module 740 identifies communications resources on which least amount of energy or energy below a predetermined threshold is detected as the unused communications resources. In some embodiments the module 742 is configured to transmit the pilot signals on the selected identified resources periodically.

In some embodiments the assembly of modules 700 further includes a module 746 configured to control the base station 600 to cease transmitting pilot signals when a signal from at least one UE device is not detected for a predetermined period of time during the monitoring operation. In some embodiments the assembly of modules 700 further includes a module 748 configured to detect/receive a signal from a UE device, and a module 750 configured to control the base station 600 to resume the pilot signal transmission operation following the detection of the signal from the UE device.

The modules shown in dashed lines boxes are optional, and thus one or more of these modules may be present in some embodiments while not in others. The dashed boxes indicate that although these modules are included in the assembly of modules 700 in various embodiments, the processor 602 may execute such an optional module in embodiments where the step to which these modules correspond, is performed. In some embodiments, one or more modules shown in FIG. 7 which are included within another module may be implemented as an independent module or modules.

Figure 8:
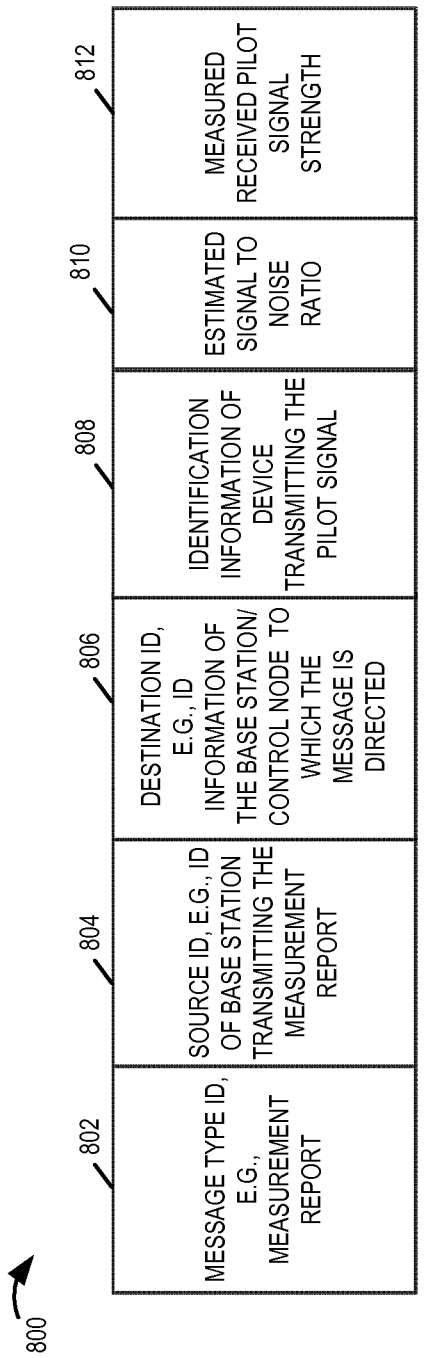
FIG. 8 illustrates an exemplary measurement report which may be communicated, e.g., from a base station or user equipment device, to a macro base station or a central control node, in accordance with an exemplary embodiment.

FIG. 8 illustrates an exemplary measurement report 800, communicated, e.g., from a small base station or a UE device that receives a pilot signal and performs measurements, in accordance with an exemplary embodiment. In some embodiments the measurement report 800 is generated by a base station, e.g., a femtocell or picocell, that receives pilot signals from one or more UE devices on the communications resources dedicated for pilot signal transmissions. In some embodiments the measurement report 800 is generated by a UE device that receives pilot signals from one or more small base stations transmitted on the communications resources dedicated for pilot signal transmissions.

As shown, the exemplary measurement report 800 includes a plurality of information fields including a message type ID field 802, a source ID field 804, a destination device ID field 806, a device identification information field 808, a signal to noise ratio (SNR) information field 810, and a measured received pilot signal strength field 812.

The message type ID field 802 includes an identifier that identifies a type of message to which the measurement report message 800 relates, for example, the information in field 802 identifies that the information in measurement report message 800 relates to pilot signal measurements. The source ID 804 includes an identifier corresponding to the device which is performing the measurements and transmitting the measurement report message 800, e.g., ID of a small base station or UE device that performs the measurements and transmits message 800.

The destination device ID field 806 includes identifier corresponding to the destination device to which the measurement report message 800 is sent. In accordance with one aspect of some embodiments the measurement report may be sent by a small base station to a base station serving the UE device from which a pilot signal is received or to a central control node such as a radio network controller (RNC). In accordance with one aspect of some embodiments the measurement report may be sent by a UE device to a small base station from which a pilot signal is received or to a central control node such as a radio network controller (RNC) or macro base station. Thus the information field 806 may include an identifier corresponding to a base station and/or an RNC.

The information field 808 includes identification information corresponding to the device, e.g., a UE device or small base station, the femto base station, which transmitted the pilot signal on which the signal measurements were performed. The SNR information field 810 includes the estimated SNR to the device from which the pilot signal was received. The signal strength information field 812 includes the measured received signal strength of the received pilot signal as measured by the device transmitting the measurement report message 800.

FIG. 9 is a flowchart 900 showing the steps of an exemplary method of operating a user equipment (UE) device, in accordance with an exemplary embodiment. In some embodiments the UE device implementing the method of flowchart 900 is any one of the active UEs shown in FIG. 1. For the purposes of discussion consider that UE 1 102 implements the method of flowchart 900.

Operation starts in step 902. In step 902 the UE 1 102 is powered on and initialized. In some embodiments the flow chart 900 is implemented by the UE only when it is in active state, i.e. when it is communication with a base station. Operation proceeds from start step 902 to step 904. In step 904 receives information, e.g., in a wireless signal, indicating communications resources that are dedicated for use in transmitting pilot signals to or receive pilot signals from base stations, e.g., from a macro base station such as base station 124. In some embodiments step 904 may not be performed and the information indicating communications resources dedicated for use in transmitting pilot signals to or receive pilot signals from base stations may be pre-stored in the UE device implementing the method of flowchart 900.

Operation proceeds from step 904 to step 906. In step 906 the UE device determines the communications resources dedicated for use in transmitting pilot signals to or receiving pilot signals from the base stations. The determination is made, e.g., based on the received information or the previously stored information indicating the resources dedicated for use in transmitting or receiving pilot signals as discussed above.

Operation proceeds from step 906 to step 908. In step 908 the UE device receives information indicating whether base stations are to transmit pilot signals using the dedicated communications resources or UE devices are to transmit pilot signals using the dedicated communications resources. The information is received e.g., from a macro base station or a central control node in some embodiments. In some embodiments the received information in step 908 includes a mode indicator which indicates to the UE device 1 102 whether the base stations or the UE devices are to transmit pilot signals using the dedicated communications resources. In some embodiments the mode indicator indicates that the UE device 1 102 is to operate in a mode in which the base stations are to transmit pilot signals using the dedicated communications resources. Step 908 is illustrated in a dashed box as it is optional and thus in some embodiments step 908 is not performed and information indicating whether the base stations or the UE devices are to transmit pilot signals using the dedicated communications resources is not received. In such embodiments the UE device 1 102 operates in a default mode which can be pre-configured in some embodiments. For example, in some embodiments in the default mode the base stations are to transmit pilot signals using the dedicated communications resources.

Operation proceeds from step 908 to step 910. In step 910 the UE device determines, e.g., based on the received information indicating which device (e.g., base stations or UEs) is to transmit pilot signals, whether the UE device is to transmit pilot signals using the dedicated communications resources or the base stations are to transmit pilot signals using the dedicated communications resources.

In various embodiments, as part of determining step 910, one or more of steps 912, 914, 916, 918, 920 and 922 are performed. In sub-step 912 the UE device determines if a mode indicator has been received, e.g., as part of the received information. If it is determined that a mode indicator has not been received, the operation proceeds to sub-step 916. If in step 912 it determined that a mode indicator has been received, the operation proceeds to sub-step 914 where it determined if the received mode indicator indicates a first mode of operation. If in sub-step 914 it is determined that the mode indicator does not indicate the first mode, operation proceeds from sub-step 914 to sub-step 916 where the UE device 1 102 operates in accordance with a default mode. Operation proceeds from sub-step 916 to sub-step 918 where the UE device determines if the default mode is set to a mode in which base stations are to transmit pilot signals using the dedicated communications resources. If it determined that the default mode is set to a mode in which base stations are to transmit pilot signals the operation proceeds to step 928 via connecting node D 924, otherwise the operation proceeds to steps 938 and 940 via connecting node E 926.

Referring again to step 914, if in step 914 it is determined if the received mode indicator indicates a first mode, the operation proceeds from sub-step 914 to sub-step 920 where the UE device operates in accordance with the first mode. Operation proceeds from sub-step 920 to sub-step 922 where the UE device determines if the first mode is set to a mode in which base stations are to transmit pilot signals. If in step 922 it is determined that the first mode is set to a mode in which base stations are to transmit pilot signals the operation proceeds from step 922 to step 928 via connecting node D 924, otherwise it is considered that the first mode is set to a mode in which UE devices are to transmit pilot signals and the operation proceeds to steps 938 and 940 via connecting node E 926. In various embodiments the default mode and the first mode are different and can be set/controlled by, e.g., the macro base station that allocates the dedicated communications resources for pilot transmissions, or by the control entity, e.g., control node 130.

Thus, depending on whether the base stations or the UE devices are to transmit pilot signals, the operation proceeds along one of two possible processing paths as illustrated.

Consider processing path that continues through node D 924. As discussed above, before reaching this processing point at connecting node D 924 it has been determined that the base stations are to transmit pilot signals. In step 928 the UE device monitors the communications resources, dedicated for use in transmitting pilot signals, for pilot signals transmitted by base stations, e.g., femtocells or picocells. Thus in step 928 the UE device begins monitoring for pilot signal transmissions from base stations on the dedicated communications resources.

Operation proceeds from step 928 to step 930. In step 930 the UE device receives a pilot signal from a base station, e.g., a femtocell or picocell. In various embodiments the transmitted pilot signals include at least one pilot and identification information corresponding to the transmitting device, e.g., ID of transmitting base station or UE device. Operation proceeds from step 930 to step 932. In accordance with one aspect of some embodiments, in step 932 the UE device performs a measurement to measure the received pilot signal strength of the pilot signal received from the base station. Operation proceeds from step 932 to step 934. In step 934 the UE device estimates a signal to noise ratio (SNR) to the base station from which the pilot signal was received. Operation proceeds from step 934 to step 936. In step 936 the UE device generates a measurement report including the measured received pilot signal strength and the estimated SNR along with identification information of the base station from which the pilot signal is received and sends the generated report to one of a base station serving the UE device performing the measurements or to a control node, e.g., radio network controller. In some embodiments a macro base station 124 that allocated the resources dedicated for pilot transmissions may act as a control node. Operation proceeds from step 936 back to step 904 via connecting node F 960.

Referring now to steps 938 and 940 long the other processing path that continues through node E 926. In step 938 the UE device monitors for signals from base stations, e.g., femtocells or picocells, e.g., to determine if one or more small base stations are present. The UE device may monitor for discovery signals, pilots, downlink data transmissions and/or synchronization signals such as PSS (primary synchronization signal) or SSS (secondary synchronization signal) from small base stations. UE device may monitor non-cellular signals transmitted by small base stations e.g. peer to peer communication signals. If a signal from one or more small base stations is detected during the monitoring, this indicates that the one or more small base stations from which the signal(s) are detected are present, e.g., in the vicinity of the UE device. Operation proceeds from step 938 to steps 944 and 9948.

In step 940, following a determination that the UE devices are to transmit pilot signals using the dedicated communications resources, the UE device monitors the communications resources dedicated for transmitting pilot signals to identify resources which are unused. In various embodiments the UE device monitors the resources to detect/measure energy on the resources. In some embodiments the resources on which least amount of energy or energy below a predetermined threshold is detected are considered unused. Operation proceeds from step 940 to step 942.

In step 942 the UE device selects one or more identified unused communications resource(s) from the communications resources dedicated for use in transmitting pilot signals. In some embodiments the UE device selects unused communication resource(s) autonomously. In some embodiments the resources selected by the UE device may depend on the identity of the UE device and/or identity of base station serving UE device. Operation proceeds from step 942 to step 944. In step 944 the UE device transmit pilot signals and identification information on communications resources included in the communications resources dedicated for use in transmitting pilot signals. In various embodiments step 944 includes step 946 where the UE device transmits pilot signals and identification information on the selected identified unused communications resources as part of transmitting the pilot signals on the communications resource(s) included in the dedicated communications resources. In some embodiments the identification information may include identity of the UE device and/or identity of base station serving the UE device. It should be noted that the UE device may transmit in the dedicated resources allocated by the macro base station during the time period when it is served by a small base station. In such embodiments the timing used by the UE device to transmit pilot signals may be derived from the signals it receives from macro base station. The UE device may use other timing for communication with the serving base station. In some embodiments, in step 926, the UE device transmits pilot signals at a predetermined power. In some embodiments step 944 is performed on a periodic basis. In various embodiments the transmitted pilot signals include at least one pilot and identification information corresponding to the transmitting UE device. Operation proceeds from step 944 to step 948.

In step 948 the UE device ceases to transmit pilot signals on the dedicated resources when it fails to detect a signal from at least one base station e.g., small base station, for a predetermined period of time during the monitoring operation, e.g., the monitoring illustrated in step 938. Thus in accordance with one feature, in some embodiments the UE device stops transmitting pilot signals and identification information when it determines that small base stations are, e.g., not in the vicinity as indicated by lack of detected signals from at least small one base station for a predetermined time during the monitoring operation. However it should be appreciated that when signals from one or more small base stations are detected during the monitoring, the UE device continues to transmit the pilot signals, e.g., periodically.

Consider for example that the UE device ceased to transmit pilot signals in step 948. Operation proceeds from step 948 to step 950 which is an optional step. In step 950 the UE device detects/receives a signal from a small base station. Operation proceeds from step 950 to step 952. Following the detection of a signal from the small base station, the UE device again resumes the pilot signal transmission operation in step 952, e.g., the transmission operation as discussed in detail in step 944 and 946. Operation proceeds from step 952 back to step 904 via connecting node F 960 and the operation may continue in this manner over time.

Figure 10:
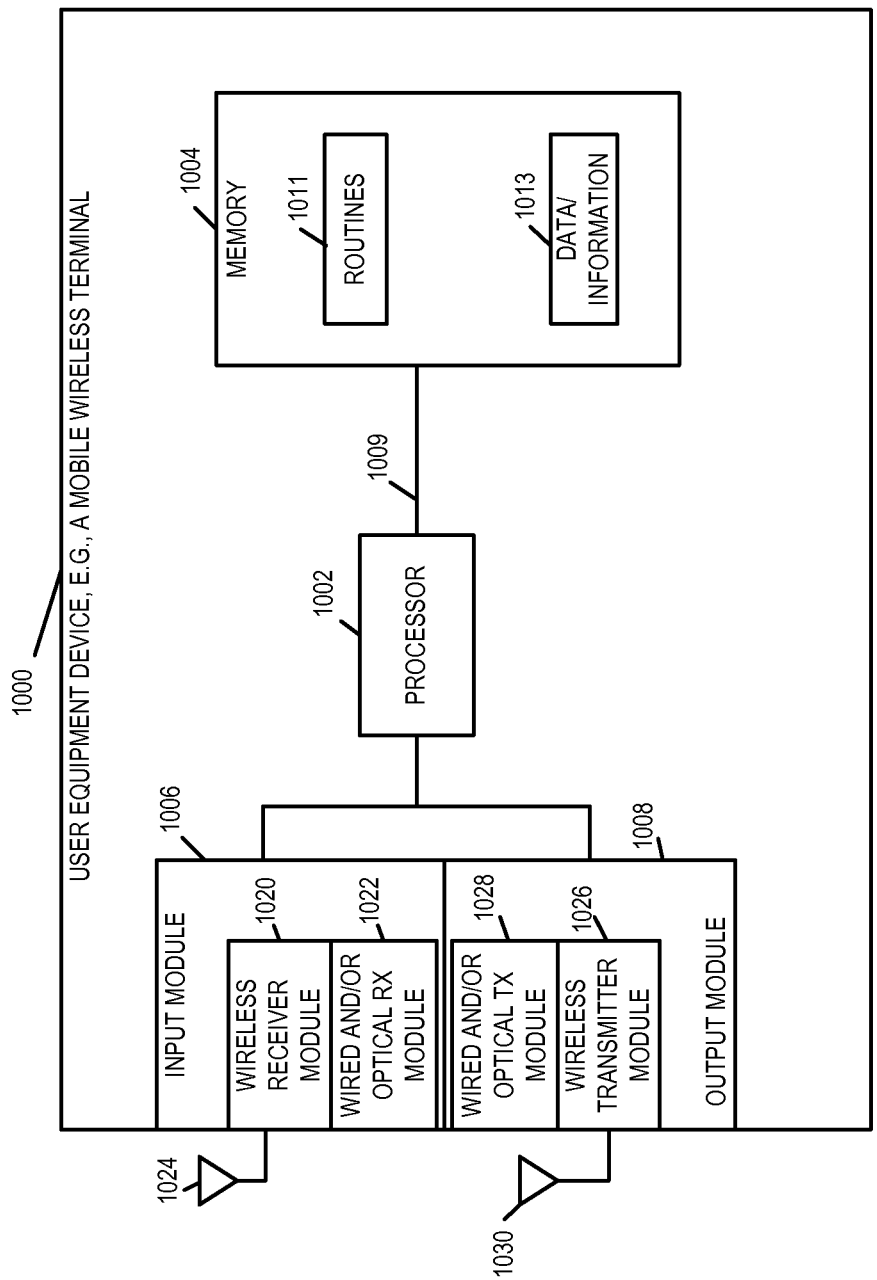
FIG. 10 illustrates an exemplary user equipment device which can be used as any one of the user equipments (UEs) shown in the exemplary system of FIG. 1.

FIG. 10 is a drawing of an exemplary user equipment (UE) device 1000, e.g., a mobile wireless terminal, in accordance with various embodiments. Exemplary UE device 1000 can be used as any one of the UE devices 102, 104, . . . 110, shown in FIG. 1. Exemplary UE device 1000 can, and sometimes does, transmit pilot signals and identification information on the communications resources allocated for pilot signal transmissions. The UE device 1000 may, and sometimes does, implement a method in accordance with flowchart 900.

The UE device 1000 includes a processor 1002 and memory 1004 coupled together via a bus 1009 over which the various elements (1002, 1004) may interchange data and information. The UE device 1000 further includes an input module 1006 and an output module 1008 which may be coupled to processor 1002 as shown. However, in some embodiments, the input module 1006 and output module 1008 are located internal to the processor 1002. Input module 1006 can receive input signals. Input module 1006 includes a wireless receiver module 1020 for receiving input including over wireless communications links. Input module 1006 also includes a wired and/or optical input receiver module 1022 for receiving input over a wired and/or optical link. Output module 1008 includes a wireless transmitter module 1026 for transmitting output signals over wireless communications links. Output module 1008 also includes a wired and/or optical output transmitter module 1028 for transmitting output signals over a wired and/or optical link. Memory 1004 includes routines 1011, and data/information 1013.

The UE device 1000 further includes wireless communications receive antenna 1024 coupled to wireless receiver module 1020 and wireless communications transmit antenna 1030 coupled to wireless transmitter module 1026. In some embodiments, the same antenna is used for both input and output wireless communications signaling.

In various embodiments, processor 1002 is configured to control the UE device 1000 to receive, e.g., from a macro base station such as base station 124, information indicating communications resources that are dedicated for use in transmitting pilot signals to or receive pilot signals from base stations, and determine the communications resources dedicated for use in transmitting pilot signals to or receive pilot signals from base stations. The information in some embodiments is received in a wireless signal. In some embodiments the processor 1002 is configured to make the determination, e.g., based on the received information or the previously stored information indicating the communications resources dedicated for use in transmitting or receiving pilot signals.

In various embodiments the processor 1002 is further configured to control the UE device to receive information indicating whether base stations are to transmit pilot signals using the dedicated communications resources or UE devices are to transmit pilot signals using the dedicated communications resources, and determine whether the UE devices are to transmit pilot signals using the dedicated communications resources or the base stations are to transmit pilot signals using the dedicated communications resources. The information is received e.g., from a macro base station or a central control node in some embodiments. In some embodiments the received information includes a mode indicator which indicates whether the base stations or the UE devices are to transmit pilot signals using the dedicated communications resources. In some embodiments the processor 1002 is configured to, as part of being configured to determine whether the base stations or UE devices are to transmit pilot signals, determine whether a mode indicator has been received and control the base station to operate in accordance with the indicated mode. In some embodiments when information indicating whether the base stations or UE devices are to transmit pilot signals and/or a mode indicator is not received, the processor 1002 is configured to determine that the UE device is to operate in a default mode. Depending on the embodiment, a default mode may be set to a mode in which either the base stations transmit pilot signals using the dedicated communications resources or the UE devices transmit pilot signals using the dedicated communications resources.

In various embodiments if it is determined that the base stations are to transmit pilot signals using the dedicated resources, the processor 1002 is further configured to monitor the communications resources dedicated for use in transmitting pilot signals for pilot signals transmitted by base stations, control the UE device to receive (e.g., via input module 1006) a pilot signal from a base station, perform a measurement to measure the received signal strength of the pilot signal received from the base station, generate an estimate of a signal to noise ratio (SNR) to the base station from which the pilot signal was received, and generate a measurement report including the measured pilot signal strength and the estimated SNR along with identification information of the base station from which the pilot signal is received. In various embodiments the processor 1002 is further configured to control the UE device to send, e.g., transmit via the output module 1008, the generated report to one of a base station serving the UE or to a control node, e.g., radio network controller.

In various embodiments when it is determined that the UE devices are to transmit pilot signals using the dedicated resources, the processor 1002 is further configured to monitor for signals from base stations, e.g., femtocells or picocells, monitor the communications resources dedicated for transmitting pilot signals to identify resources which are unused, and select one or more identified unused communications resources from the communications resources dedicated for use in transmitting pilot signals, and control the UE device to transmit pilot signals and identification information on communications resources included in the communications resources dedicated for use in transmitting pilot signals. In various embodiments the processor 1002 is configured to control the UE device to transmit pilot signals and identification information on the selected identified unused communications resources as part of being configured to control transmission of pilot signals on the communications resources included in the dedicated communications resources. In some embodiments the processor 1002 is configured to control the UE device to transmit pilot signals on a periodic basis.

In some embodiments the processor 1002 is configured to measure energy on the communications resources as part of being configured to identify unused communications resources and identify the resources on which least amount of energy or energy below a predetermined threshold is detected as the unused communications resources. In various embodiments the transmitted pilot signals include at least one pilot and identification information corresponding to the transmitting UE device.

In some embodiments the processor 1002 is configured to control the UE device to cease to transmit pilot signals when a signal from at least one small base station is not detected for a predetermined period of time during the monitoring operation. In some embodiments the processor 1002 is further configured to resume the pilot signal transmission when a signal from a small base station is detected. Thus in some embodiments the processor 1002 is configured to control the UE device to: detect/receive a signal from a small base station and resume transmission of pilot signals.

Figure 11:
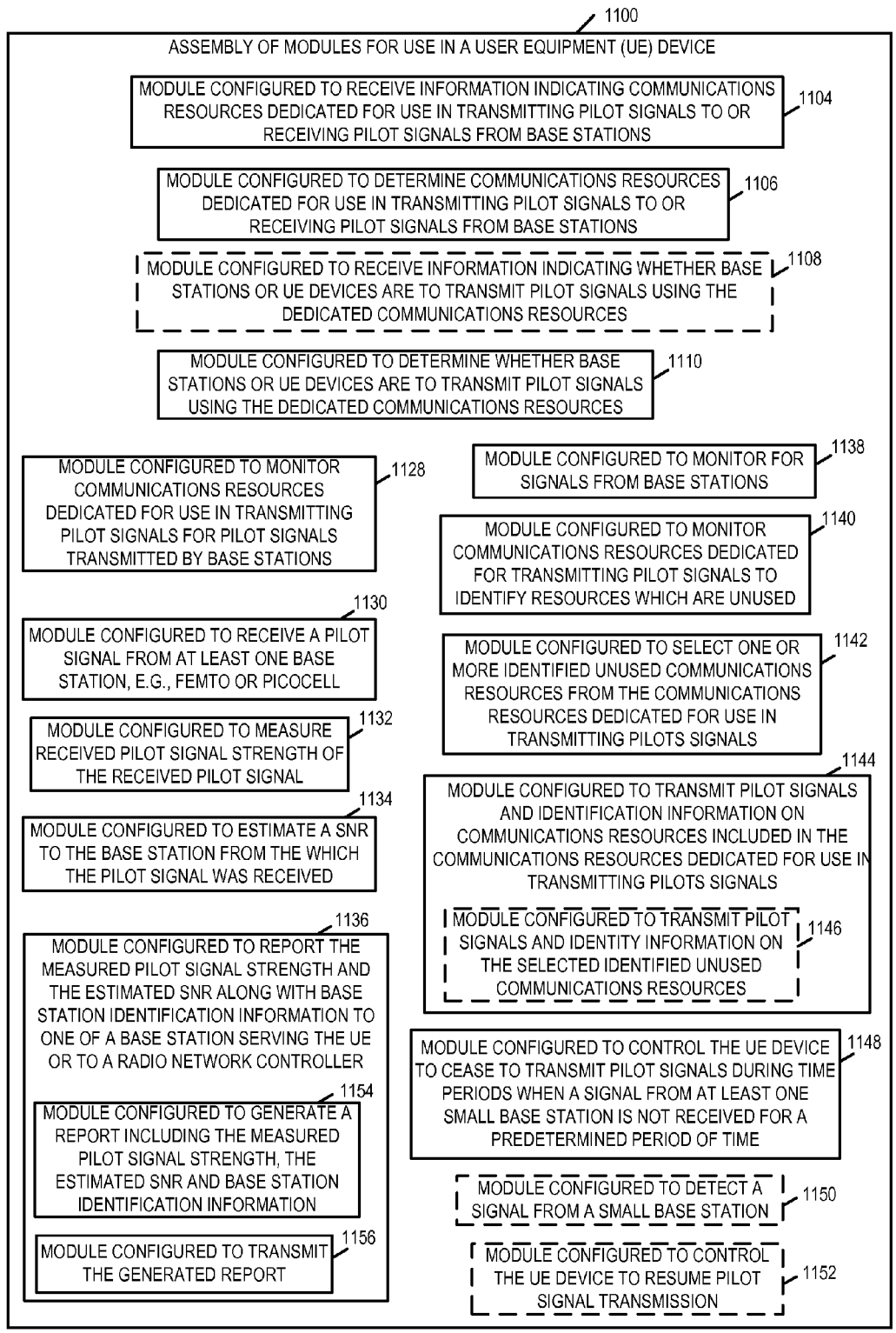
FIG. 11 illustrates an assembly of modules which can be used in the exemplary user equipment device shown in FIG. 10.

FIG. 11 is an assembly of modules 1100 which can, and in some embodiments is, used in the exemplary UE device 1000 illustrated in FIG. 10. The modules in the assembly 1100 can be implemented in hardware within the processor 1002 of FIG. 10, e.g., as individual circuits. The modules in the assembly 1100 can, and in some embodiments are, implemented fully in hardware within the processor 1002, e.g., as individual circuits. In other embodiments some of the modules are implemented, e.g., as circuits, within the processor 1002 with other modules being implemented, e.g., as circuits, external to and coupled to the processor. As should be appreciated the level of integration of modules on the processor and/or with some modules being external to the processor may be one of design choice. In some but not necessarily all embodiments some of the modules discussed below, e.g., modules 1106, 1110, 1128, 1138, 1140, 1132, and 1134, are implemented in the processor 1002 with the other modules, e.g., modules 1104, 1108, 1144 etc., being implemented in the processor and/or external to the processor 1002.

Alternatively, rather than being implemented as circuits, all or some of the modules may be implemented in software and stored in the memory 1004 of the UE device 1000 shown in FIG. 10 with the modules controlling operation of the UE device 1000 to implement the functions corresponding to the modules when the modules are executed by a processor, e.g., processor 1002. In some such embodiments, the assembly of modules 1100 is included in routines 1011 of memory 1004 of the UE device 1000 of FIG. 10. In still other embodiments, various modules are implemented as a combination of hardware and software, e.g., with another circuit external to the processor providing input to the processor 1002 which then under software control operates to perform a portion of a module's function.

While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In some embodiments, processor 1002 is configured to implement each of the modules of the assembly of modules 1100. In embodiments where the assembly of modules 1100 is stored in the memory 1004, the memory 1004 is a computer program product comprising a computer readable medium, e.g., a non-transitory computer readable medium, comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the UE device 1000 or elements therein such as the processor 1002, to perform the functions of the corresponding steps illustrated and/or described in the method of flowchart 900 of FIG. 9.

Assembly of modules 1100 includes a module 1104 configured to receive information indicating communications resources that are dedicated for use in transmitting pilot signals to or receive pilot signals from base stations, e.g., small base stations, a module 1106 configured to determine the communications resources dedicated for use in transmitting pilot signals to or receive pilot signals from base stations, e.g., based on the received information or the previously stored information indicating the resources dedicated for use in transmitting or receiving pilot signals, a module 1108 configured to receive information indicating whether base stations are to transmit pilot signals using the dedicated communications resources or UE devices are to transmit pilot signals using the dedicated communications resources, and a module 1110 configured to determine whether the base stations or UE devices are to transmit pilot signals using the dedicated communications resources. In some embodiments the determination module 1110 performs the determination, e.g., based on the received information indicating whether base stations or UE devices are to transmit pilot signals using the dedicated communications resources. In various embodiments the determination module 1110 is configured to perform/implement the functions discussed in the corresponding step 910 of flowchart 900. Thus in various embodiments the module 1110 is configured to determine whether a mode indicator indicating whether base stations or UE devices are to transmit pilot signals using the dedicated communications resources is received and perform one or more other determinations discussed in step 910 and/or the sub-steps therein. In some embodiments when a mode indicator is not received the determination module 1110 is configured to determine that the UE device 1000 is to operate in a default mode.

In various embodiments the assembly of modules 1100 further includes a module 1128 configured to monitor communications resources, dedicated for use in transmitting pilot signals, for pilot signals transmitted by base stations, a module 1138 configured to monitor for signals from base stations, and a module 1140 configured to monitor the communications resources dedicated for transmitting pilot signals to identify resources which are unused.

The assembly of modules 1100 in some embodiments further includes a module 1130 configured to receive a pilot signal from at least one base station, e.g., femtocell or picocell, a module 1132 configured to perform measurements to measure the received signal strength of the received pilot signal, a module 1134 configured to estimate a signal to noise ratio (SNR) to the base station from which the pilot signal was received, and a module 1136 configured to report the measured pilot signal strength and the estimated SNR along with identification information of the base station from which the pilot signal was received to one of a base station or to a control node, e.g., radio network controller. In some embodiments the module 1136 for reporting includes a module 1154 configured to generate a report including the measured pilot signal strength, the estimated SNR and base station identification information, and a module 1156 configured to transmit the generated report to one of a base station serving the UE or to the control node, e.g., radio network controller.

In various embodiments the assembly of modules 1100 further includes a module 1142 configured to select one or more identified unused communications resources for transmitting pilot signals from the communications resources dedicated for use in transmitting pilot signals, and a module 1144 configured to transmit pilot signals and identification information on communications resources included in the communications resources dedicated for use in transmitting pilot signals when it is determined that the UE devices are to transmit pilot signals using the dedicated resources. In some embodiments the module 1142 is configured to measure energy on the communications resources dedicated for pilot transmissions to identify the unused dedicated resources. In some embodiments the module 1142 identifies communications resources on which least amount of energy or energy below a predetermined threshold is detected as the unused communications resources. In some embodiments the module 1144 includes a module 1146 configured to control the UE device to transmit, e.g., via the output module 1008, pilot signals and identification information on the selected identified unused communications resources as part of controlling the UE device to transmit the pilot signals on the communications resources included in the dedicated communications resources.

In some embodiments the assembly of modules 1100 further includes a module 1148 configured to control the UE device to cease transmitting pilot signals when a signal from at least one small base station is not detected for a predetermined period of time during the monitoring operation. In some embodiments the assembly of modules 1100 further includes a module 1150 configured to detect/receive a signal from a small base station, and a module 1152 configured to control the UE device to resume the pilot signal transmission operation following the detection of the signal from a small base station, e.g., one of a femto base station or pico base station.

The modules shown in dashed lines boxes are optional, and thus one or more of these modules may be present in some embodiments while not in others. The dashed boxes indicate that although these modules are included in the assembly of modules 1100 in various embodiments, the processor 1002 may execute such an optional module in embodiments where the step to which these modules correspond, is performed. In some embodiments, one or more modules shown in FIG. 11 which are included within another module may be implemented as an independent module or modules.

Various features may be used in a wide range of systems and/or methods. In accordance with one aspect, an exemplary method in accordance with some embodiments, includes one, more or all of the following features and/or steps.

In at least one embodiment a macro cell 124 (e.g., an eNodeB a.k.a. eNB) configures, e.g, allocates, a group of periodic time and communications resources (sometimes referred to herein as handover resources) to be used for pilot transmissions intended to facilitate handover related signal measurements. The macro cell 124 configures, e.g., allocates the resources for their intended purpose, in one more or all carriers, e.g., frequencies, in which a small base station (also referred to as small cell) is deployed within the coverage area of the macro cell 124. The resources and periodicity can, and in some embodiments do, differ with the carrier and/or number of small cells or UE devices 102, 106, 110 present in the area in which the resources are being allocated.

The macro base station 124 then configures either small cells 112, 116 or active UEs 102, 106, 110 in the macro base station's coverage area to transmit on the handover resources, e.g., pilot signals and related information. The selection of either the small cells or active UEs should transmit is based, in some embodiments, on the density of the small cells and the density of the active UEs in the macro cell 124 where the active UEs and the small cells are within the coverage area 161 of the macro cell. In some embodiments the macro base station 124 configures the active UEs 102, 106, 110 to transmit pilot signals using the handover resources if the number of UEs is smaller than the number small cells. In this state, the small cells 112, 116 are configured to receive the signals transmitted by the active UEs using the handover resources. This communication may be described as uplink communication as should be appreciated from the fact the UEs 102, 106, 110 are transmitting the pilot signals. Alternatively, the macro base station 124 configures the small cells 112, 116 to transmit pilot signals in the handover resources if the number of active UEs 102, 106, 110 is greater than the number of the small cells 112, 116. The configuration of the small cells 112, 116 and/or UEs 102, 106, 110 can be performed by the macro base station 124 transmitting, e.g., broadcasting or otherwise communicating, configuration information to the UEs 102, 106, 110 and/or small cells 112, 116.

When the small base stations 112, 116 are configured to transmit pilots, the active UEs 102, 106, 110 are configured to receive the signals transmitted by the small cells 112, 116 using the handover resources. This communication may be described as downlink communication since it involves transmission performed by one or more small base stations 112, 116.

In some embodiments the configuration of whether small base stations 112, 116 or UEs 102. 106, 110 are to transmit pilot signals on resources allocated by the macro base station 124 can change dynamically in time and space. For example, a first macro base station 124 can configure small cells associated with the first macro base station 124 as transmitters and a second macro base station, e.g., located adjacent the first macro base station 124 in another macro cell 171 can configure UEs 102, 106, 110 associated with the second macro base station as transmitters of pilot signals at the same time UEs 102, 106, 110 in the adjacent cell 161 are configured to be receivers of pilot signals. Furthermore, the first macro base station 124 may initially configure small cells associated with the first macro base station 124 to transmit using the handover resources and UEs associated with the first macro base station 124 to receive using the handover resources and later, e.g., at some later point in time, the first macro base station 124 may configure the UEs 102, 106, 110 in its cell 161 to transmit using the handover resources and the small cells 112, 116 to receive, e.g., the transmitted pilot signals and corresponding device identification information, using the handover resources. In one embodiment, the macro base station 124 changes the configuration of whether small cells 112, 116 or UEs 102, 106, 110 should transmit pilots based on the number of small cells associated with, e.g., in the coverage area of, the first macro base station 124 and the number of active UEs 102, 106, 110 associated with, e.g., in the coverage area 161, of the first macro base station 124.

In some embodiments when handover resources which are dedicated for use by small cells 112, 116 or UEs 102, 106, 110 are allocated for uplink communication during which the UEs 102, 106, 110 transmit e.g., pilot signal, via the handover resources and the small cells 112, 116 receive via the handover resources. In at least some such embodiments when handover resources are dedicated on the uplink the small cells 112, 116 do not transmit pilots and no pilot transmission resources are made available to the small cells 112, 116 for transmission of pilots on the downlink.

In at least some embodiments when handover resources are allocated on the downlink, the small cells 112, 116 transmit, e.g., pilots, via the handover resources and the UEs 102, 106, 110 receive via the handover resources but do not transmit pilots. In some embodiments, the handover resources are allocated in the frequency band in which the small cells 112, 116 transmit (downlink band) and in some other embodiments the handover resources are allocated in the frequency band in which the UEs 102, 106, 110 transmit (uplink band).

In various embodiments the configured transmitters, e.g., the UEs 102, 110 or the small base stations 112, 120, select one of the handover resources autonomously and transmit a wideband signal periodically in the selected resource. The devices transmitting the pilots transmit wide band pilot signals, e.g., at predetermined power level, along with information indicating the transmitting devices identity. The wideband pilot may include a signal transmitted on each of a plurality of different tones, e.g. during a single or multiple symbol transmission time periods. In some embodiments, an S-TMSI is used as the identifier in case when the UEs 106, 110 are to transmit pilots, and cell ID is used as an identifier in case when small cells 112, 120 are to transmit pilots. A transmitter, e.g., transmitting device, can, and in some embodiments does, make measurements of one or more of the handover resources and, based on the measurements, choose the resource on which it received the least amount of energy to use for its pilot signal transmissions. In this way the risk of collusions can be reduced or minimized as compared to the case where devices, e.g., UEs 102, 110 or small cells 112, 120, randomly select from the available pilot signal transmission resources to transmit there pilots and corresponding identification information.

In various embodiments the devices e.g., UEs 102, 110 or small cells 112, 120, transmitting with a macro cell 161, use a timing derived from a common source. For example, downlink timing received from the macro base station 124 or uplink timing used to transmit to the macro base station 124.

In some but not all embodiments to avoid unnecessary interference to other pilot transmissions that may share the same handover resources as those being used by the transmitting device, the transmitting device transmits on the handover resource only when there are receivers known to nearby, e.g., within communication range, of the transmitting device. For example in some embodiments if the transmitters are small cells 112, 116, they monitor for active UEs 102, 106, 110 nearby by receiving signals and checking the signals to determine they are UE specific signals, e.g., signals which can be decoded and relate to the presence or indicate the presence of an active UE. Signals which are monitored for to detect UE presence include, in some embodiments specific signals such as, e.g., SRS, PRACH, PUCCH, etc. which are transmitted by active UEs 102, 106, 110 and which can be detected by a small base station 112, 116 in the presence of a UE 102, 106, 110.

In some but not all embodiments, if the transmitters of pilot signals are active UEs 102, 106, 110, the active UEs 102, 106, 110 determine that a small cell 112, 116 is nearby by monitoring for and attempting to detect signals from the small cell 112, 116. When such signals from small cells are detected, the UE 102, 106, 10 will transmit pilots but not when a small cell 112, 116 is not detected. The UE 102, 106, 110 may detect the presence of a small cell by decoding discovery signals transmitted by the small cells 112, 116. The signals which can, and sometimes are, detected and decoded to determine the presence of a small cell include, e.g., PSS/SSS or LTED like discovery signals.

In various embodiments the devices monitoring to receive pilots, e.g., either the small cells 112, 116 or the active UEs 106, 110, depending on the configuration being implemented, measure the pilot signals transmitted using the handover resources and report the handover measurements (e.g., RSSI) to the macro base station 124 or to a centralized entity such as control node 130, other than the source macro base station 124, to which the active UE 106, 110. In some embodiments the control node 130 is a radio network controller which has control over handover decisions.

Depending on the embodiment, the macro base station 124 or the centralized entity 130 makes a handover decision based on the reported handover measurements. The centralized entity 130 making the decision communicates the decision to the corresponding macro base station 124 (when the base station is not the decision making node). The handover information is also communicated to the macro base station 124 or small base station 112, 116 to which the handover is being made via the backhaul network. The corresponding UE to which a handover decision relates is notified when a handover is to occur via downlink signals transmitted by the serving base station 124, 112, or 116 at the time of the handover. The entity making a handover decision, e.g., macro base station 124 or the centralized 130 entity may, and in some embodiments does, base its decision not only on RSSI measurements but also on one or more other factors such as interference caused to other small cells 112, 116 by turning on a new small cell, the backhaul capacity of the small cell, type of quality of service (QoS) supported by the small cell and required by UE etc.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware. In embodiments where modules are implemented as circuits, the apparatus may, and in some embodiments does, include a separate individual circuit for performing the function corresponding to each individual module. Thus, in some cases each individual module is implemented as an individual circuit.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first base station corresponding to a cell having a coverage area in which a small base station is located, the method comprising:
    allocating communications resources for pilot signal transmissions by any of a plurality of small base stations or user equipment (UE) devices, said allocated communications resources being dedicated for pilot signal transmissions, said small base station being one of said plurality of small base stations;
    determining whether the small base stations or the UE devices should use said allocated communications resources for pilot signal transmissions; and
    communicating information to at least one of said small base stations or said UE devices indicating the communications resources allocated for pilot signal transmissions.

2. The method of claim 1, further comprising:
    controlling said first base station to refrain from using said allocated communications resources to transmit signals.

3. The method of claim 1, further comprising:
    changing at least one of a duration or frequency of communications resources allocated for pilot signal transmission by said small base stations or UE devices in response to a change in at least one of a number of small base stations or a change in a number of UE devices in the coverage area corresponding the first base station.

4. The method of claim 1, further comprising:
    transmitting information indicating whether the small base stations or the UE devices are to transmit pilots signals using said allocated communications resources.

5. The method of claim 4, further comprising:
    repeating, using updated information indicating a new number of UE devices within the coverage area of said first base station or a new number of small base stations in the coverage area of said first base station, said steps of:
    determining whether the small base stations or the UE devices should use said allocated communications resources for pilot signal transmissions; and
    transmitting information indicating whether the small base stations or the UE devices are to transmit pilot signals using said allocated communications resources.

6. The method of claim 1, wherein determining whether the small base stations or the UE devices should use said allocated communications resources for pilot signal transmission includes:
    comparing a number of small base stations in the coverage area of said first base station to a number of UE devices in the coverage area of said first base station;
    selecting the UE devices to transmit pilot signals when said comparison indicates that the number of UE devices is smaller than the number of small base stations; and
    selecting the small base stations to transmit pilot signals when said comparison indicates that the number of UE devices is not smaller than the number of small base stations.

7. A first base station corresponding to a cell having a coverage area in which a small base station is located, the first base station comprising:
    means for allocating communications resources for pilot signal transmissions by any of a plurality of small base stations or user equipment (UE) devices, said allocated communications resources being dedicated for pilot signal transmissions, said small base station being one of said plurality of small base stations;

means for determining whether the small base stations or the UE devices should use said allocated communications resources for pilot signal transmissions; and means for communicating information to at least one of said small base stations or said UE devices indicating the communications resources allocated for pilot signal transmissions.

8. The first base station of claim 7, further comprising:
means for controlling said first base station to refrain from using said allocated communications resources to transmit signals.

9. The first base station of claim 7, further comprising:
means for changing at least one of a duration or frequency of communications resources allocated for pilot signal transmission by said small base stations or UE devices in response to a change in at least one of a number of small base stations or a change in a number of UE devices in the coverage area corresponding the first base station.

10. The first base station of claim 7, wherein said means for communicating include means for transmitting information indicating whether the small base stations or the UE devices are to transmit pilots signals using said allocated communications resources.

11. The first base station of claim 7, wherein said means for determining whether the small base stations or the UE devices should use said allocated communications resources for pilot signal transmission, include:
means for comparing a number of small base stations in the coverage area of said first base station to a number of UE devices in the coverage area of said first base station;
means for selecting the UE devices to transmit pilot signals when said comparison indicates that the number of UE devices is smaller than the number of small base stations; and
means for selecting the small base stations to transmit pilot signals when said comparison indicates that the number of UE devices is not smaller than the number of small base stations.

12. A first base station corresponding to a cell having a coverage area in which a small base station is located, the first base station comprising:
at least one processor configured to:
allocate communications resources for pilot signal transmissions by any of a plurality of small base stations or user equipment (UE) devices, said allocated communications resources being dedicated for pilot signal transmissions, said small base station being one of said plurality of small base stations;
determine whether the small base stations or the UE devices should use said allocated communications resources for pilot signal transmissions; and
communicate information to at least one of said small base stations or said UE devices indicating the communications resources allocated for pilot signal transmissions; and
a memory coupled to said at least one processor.

13. The first base station of claim 12, wherein said at least one processor is further configured to:
change at least one of a duration or frequency of communications resources allocated for pilot signal transmission by said small base stations or UE devices in response to a change in at least one of a number of small base stations or a change in a number of UE devices in the coverage area corresponding the first base station.

14. The first base station of claim 12, wherein said at least one processor is further configured, as part of being configured to determine whether the small base stations or the UE devices should use said allocated communications resources for pilot signal transmission, to:
compare a number of small base stations in the coverage area of said first base station to a number of UE devices in the coverage area of said first base station;
select the UE devices to transmit pilot signals when said comparison indicates that the number of UE devices is smaller than the number of small base stations; and
select the small base stations to transmit pilot signals when said comparison indicates that the number of UE devices is not smaller than the number of small base stations.

15. A computer program product for use in a first base station corresponding to a cell having a coverage area in which a small base station is located, the computer program product comprising:
a non-transitory computer readable medium comprising:
code for causing at least one computer to allocate communications resources for pilot signal transmissions by any of a plurality of small base stations or user equipment (UE) devices, said allocated communications resources being dedicated for pilot signal transmissions, said small base station being one of said plurality of small base stations;
code for causing said at least one computer to determine whether the small base stations or the UE devices should use said allocated communications resources for pilot signal transmissions; and
code for causing said at least one computer to communicate information to at least one of said small base stations or said UE devices indicating the communications resources allocated for pilot signal transmissions.

16. The computer program product of claim 15, the non-transitory computer readable medium further comprising:
code for controlling said first base station to refrain from using said allocated communications resources to transmit signals.

17. The computer program product of claim 15, the non-transitory computer readable medium further comprising:
code for changing at least one of a duration or frequency of communications resources allocated for pilot signal transmission by said small base stations or UE devices in response to a change in at least one of a number of small base stations or a change in a number of UE devices in the coverage area corresponding the first base station.

18. The computer program product of claim 15, the non-transitory computer readable medium further comprising:
code for transmitting information indicating whether the small base stations or the UE devices are to transmit pilots signals using said allocated communications resources.

19. The computer program product of claim 15, wherein the code for determining whether the small base stations or the UE devices should use said allocated communications resources for pilot signal transmission further comprises:
code for comparing a number of small base stations in the coverage area of said first base station to a number of UE devices in the coverage area of said first base station;
code for selecting the UE devices to transmit pilot signals when said comparison indicates that the number of UE devices is smaller than the number of small base stations; and
code for selecting the small base stations to transmit pilot signals when said comparison indicates that the number of UE devices is not smaller than the number of small base stations.

20. The computer program product of claim 19, the non-transitory computer readable medium further comprising:
- code for repeating, using updated information indicating a new number of UE devices within the coverage area of said first base station or a new number of small base stations in the coverage area of said first base station, said steps of:
- determining whether the small base stations or the UE devices should use said allocated communications resources for pilot signal transmissions; and
- transmitting information indicating whether the small base stations or the UE devices are to transmit pilot signals using said allocated communications resources.

\* \* \* \* \*